US012563371B2

(12) United States Patent
Ueda et al.

(10) Patent No.: US 12,563,371 B2
(45) Date of Patent: Feb. 24, 2026

(54) ITEM MANAGING APPARATUS, ITEM MANAGING SYSTEM, AND ITEM MANAGING METHOD

(71) Applicant: SATO HOLDINGS KABUSHIKI KAISHA, Tokyo (JP)

(72) Inventors: Yoshiyuki Ueda, Tokyo (JP); Mitsutoshi Sakagami, Tokyo (JP)

(73) Assignee: SATO CORPORATION, Tokyo (JP)

( * ) Notice: Subject to any disclaimer, the term of this patent is extended or adjusted under 35 U.S.C. 154(b) by 13 days.

(21) Appl. No.: 18/837,142

(22) PCT Filed: Feb. 21, 2023

(86) PCT No.: PCT/JP2023/006258
§ 371 (c)(1),
(2) Date: Aug. 8, 2024

(87) PCT Pub. No.: WO2023/162986
PCT Pub. Date: Aug. 31, 2023

(65) Prior Publication Data
US 2025/0193642 A1      Jun. 12, 2025

(30) Foreign Application Priority Data

Feb. 28, 2022     (JP) ................................. 2022-030449

(51) Int. Cl.
*G08B 13/24* (2006.01)
*G06Q 10/087* (2023.01)
(Continued)

(52) U.S. Cl.
CPC .......... *H04W 4/38* (2018.02); *G06Q 30/0201* (2013.01)

(58) Field of Classification Search
CPC ............. G08B 13/2462; G06Q 10/087; G06Q 30/0201; H04W 4/38
See application file for complete search history.

(56) References Cited

U.S. PATENT DOCUMENTS 6,008,727 A * 12/1999 Want .................. G06K 7/10079
                                              340/572.1
6,176,425 B1 * 1/2001 Harrison .......... G06K 19/07327
                                              235/383
(Continued)

FOREIGN PATENT DOCUMENTS

CN        101204279 A      6/2008
CN        111597843 A      8/2020
(Continued)

OTHER PUBLICATIONS

Extended European Search Report issued in EP Appl. No. 23759987.3 dated Mar. 27, 2025.

*Primary Examiner* — Hoi C Lau
(74) *Attorney, Agent, or Firm* — Foley & Lardner LLP

(57) ABSTRACT

An item managing apparatus includes: an item attachment device including a linear member and a biasing member, the linear member including one end that is attached to an item, the biasing member biasing the linear member from the one end in a first direction; a communication device attached to the linear member; and a device accommodation part that can accommodate the communication device, the device accommodation part being configured to exert an electromagnetic shielding function for the communication device when the communication device is accommodated in the device accommodation part. When no external force is applied to the item against biasing force of the first direction generated by the biasing member, the communication device is accommodated in the device accommodation part, and when external force is applied to the item against the biasing force of the first direction, the communication device is enabled to exit from the device accommodation part.

15 Claims, 20 Drawing Sheets

(51) Int. Cl.
  *G06Q 30/0201* (2023.01)
  *H04W 4/38* (2018.01)

(56) References Cited

U.S. PATENT DOCUMENTS

| | | | | |
|---|---|---|---|---|
| 6,249,226 | B1 * | 6/2001 | Harrison | G06K 7/0008 |
| | | | | 340/10.6 |
| 6,340,931 | B1 * | 1/2002 | Harrison | G06K 19/0723 |
| | | | | 340/5.2 |
| 6,342,830 | B1 * | 1/2002 | Want | G06K 19/0717 |
| | | | | 343/873 |
| 6,446,208 | B1 * | 9/2002 | Gujar | G06K 7/0008 |
| | | | | 713/184 |
| 7,598,868 | B2 * | 10/2009 | Lee | G08B 13/2402 |
| | | | | 200/61.93 |
| 7,719,425 | B2 * | 5/2010 | Colby | G06K 19/07327 |
| | | | | 340/572.1 |
| 7,838,844 | B2 * | 11/2010 | Wagner | G21G 4/08 |
| | | | | 250/252.1 |
| 7,948,381 | B2 * | 5/2011 | Lindsay | G06K 19/07345 |
| | | | | 340/539.11 |
| 7,950,585 | B2 * | 5/2011 | Skowronek | G06K 19/07327 |
| | | | | 235/492 |
| 8,400,270 | B2 * | 3/2013 | Brand | F16D 66/00 |
| | | | | 455/344 |
| 8,487,769 | B2 * | 7/2013 | Lindsay | G06K 19/07767 |
| | | | | 340/539.11 |
| 9,524,458 | B2 * | 12/2016 | Colby | G06K 19/07345 |
| 9,569,777 | B2 * | 2/2017 | Colby | G06K 7/10316 |
| 10,037,449 | B1 * | 7/2018 | Hahn | G06K 19/0707 |
| 10,089,505 | B1 * | 10/2018 | Huebner | G06K 7/10415 |
| 10,262,172 | B1 * | 4/2019 | Niranjayan | G06K 7/10326 |
| 10,417,462 | B2 * | 9/2019 | Colby | G06Q 20/3278 |
| 10,417,463 | B2 * | 9/2019 | Colby | G06Q 20/3278 |
| 10,621,528 | B2 * | 4/2020 | Dong | G06Q 10/06315 |
| 10,650,199 | B2 * | 5/2020 | Colby | G06K 7/10158 |
| 10,956,689 | B2 * | 3/2021 | Colby | G06Q 20/327 |
| 11,347,949 | B2 * | 5/2022 | Colby | G07G 1/009 |
| 11,599,762 | B2 * | 3/2023 | Oishi | G07G 1/009 |
| 12,333,483 | B2 * | 6/2025 | Okabe | G06Q 10/0838 |
| 2006/0187055 | A1 * | 8/2006 | Colby | G06K 19/07749 |
| | | | | 343/841 |

| | | | | |
|---|---|---|---|---|
| 2006/0187060 | A1 * | 8/2006 | Colby | H01Q 1/526 |
| | | | | 343/841 |
| 2006/0187061 | A1 * | 8/2006 | Colby | H01Q 1/22 |
| | | | | 343/841 |
| 2006/0220858 | A1 * | 10/2006 | Kawamata | G01R 31/2822 |
| | | | | 340/572.1 |
| 2007/0063847 | A1 * | 3/2007 | Lee | G08B 13/2402 |
| | | | | 340/572.1 |
| 2007/0152829 | A1 * | 7/2007 | Lindsay | G06K 19/07345 |
| | | | | 340/10.2 |
| 2008/0265039 | A1 * | 10/2008 | Skowronek | G06K 19/07327 |
| | | | | 235/492 |
| 2009/0072949 | A1 * | 3/2009 | Fukuda | H01Q 7/00 |
| | | | | 343/893 |
| 2009/0167502 | A1 * | 7/2009 | Erickson | G06K 7/0008 |
| | | | | 340/572.1 |
| 2009/0231097 | A1 * | 9/2009 | Brand | G06K 7/0008 |
| | | | | 340/10.1 |
| 2010/0013603 | A1 * | 1/2010 | Chatani | G06Q 30/02 |
| | | | | 340/10.6 |
| 2011/0254665 | A1 * | 10/2011 | Lindsay | G06K 19/07345 |
| | | | | 340/10.5 |
| 2012/0025988 | A1 | 2/2012 | Harada | |
| 2012/0299703 | A1 * | 11/2012 | Chen | G06K 19/0722 |
| | | | | 235/375 |
| 2014/0197953 | A1 | 7/2014 | Valiulis et al. | |
| 2015/0208826 | A1 | 7/2015 | Yang et al. | |
| 2017/0213173 | A1 * | 7/2017 | Dong | G06Q 10/06315 |
| 2019/0138766 | A1 * | 5/2019 | Colby | G06Q 20/4012 |
| 2019/0244069 | A1 * | 8/2019 | Oishi | G06Q 20/3278 |
| 2020/0302257 | A1 * | 9/2020 | Oishi | G06K 19/0723 |
| 2022/0051066 | A1 * | 2/2022 | Oishi | G06K 7/0008 |
| 2022/0309458 | A1 * | 9/2022 | Okabe | G06Q 50/04 |
| 2025/0037559 | A1 * | 1/2025 | Ueda | G08B 13/2462 |
| 2025/0193642 | A1 * | 6/2025 | Ueda | G06Q 30/0201 |

FOREIGN PATENT DOCUMENTS

| | | |
|---|---|---|
| JP | 2005-148884 A | 6/2005 |
| JP | 2009-100952 A | 5/2009 |
| JP | 2017-505175 A | 2/2017 |
| JP | 2019-205483 A | 12/2019 |
| WO | WO-2010/104066 A1 | 9/2010 |

* cited by examiner

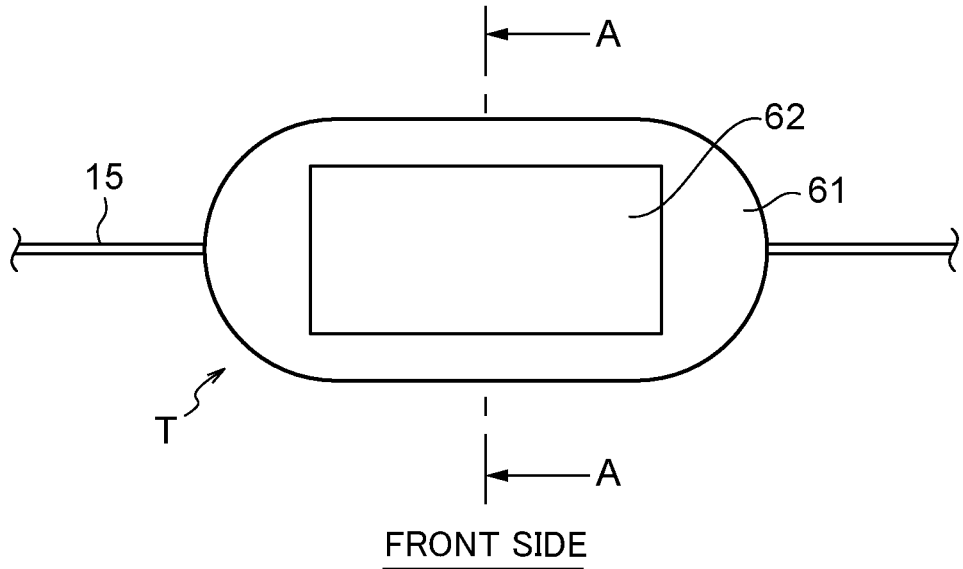
FRONT SIDE
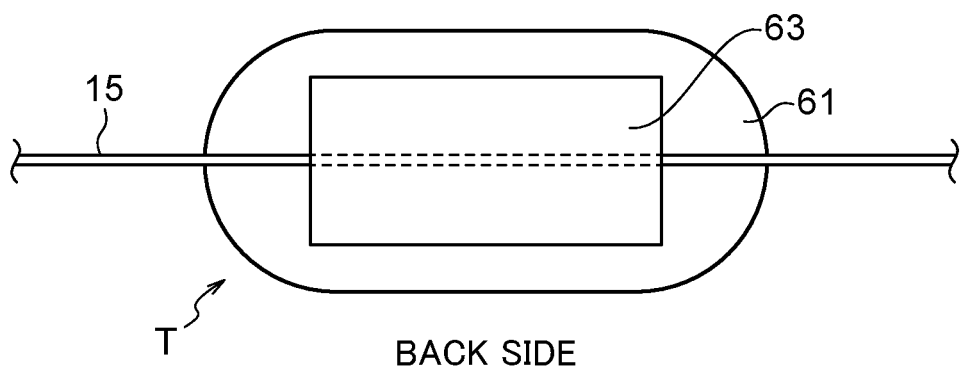
BACK SIDE
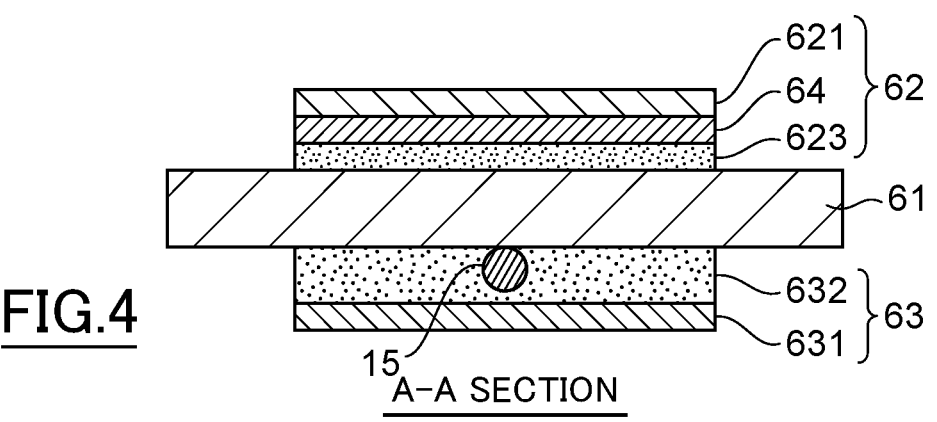
FIG.4
A–A SECTION

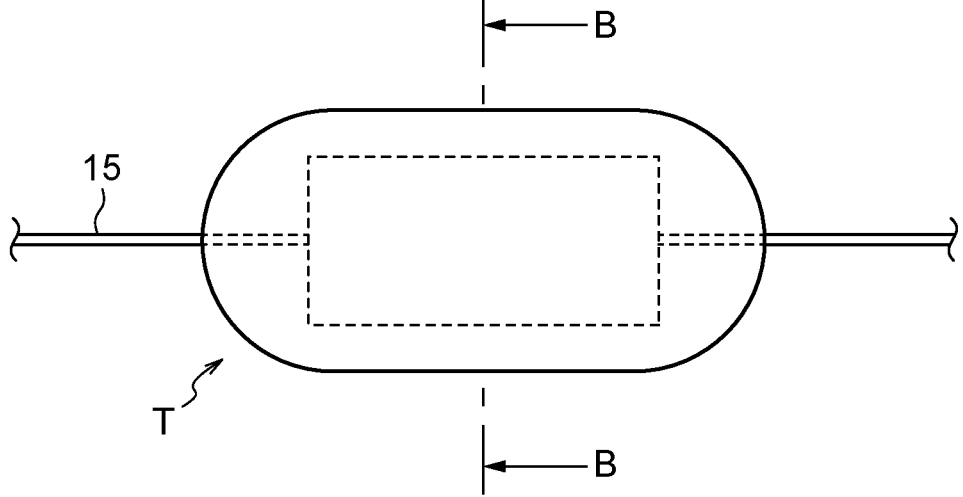
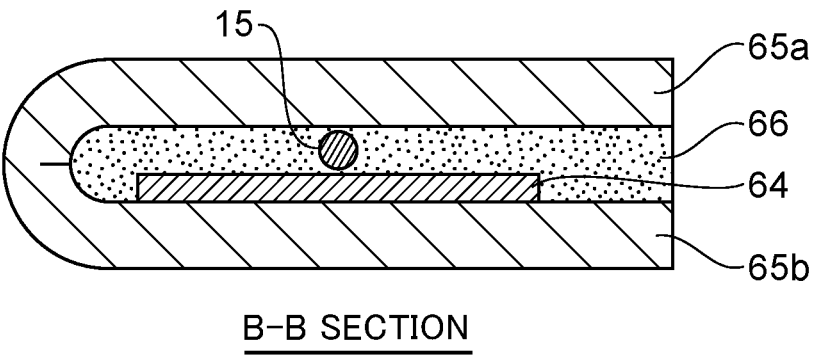
B-B SECTION
FIG.6

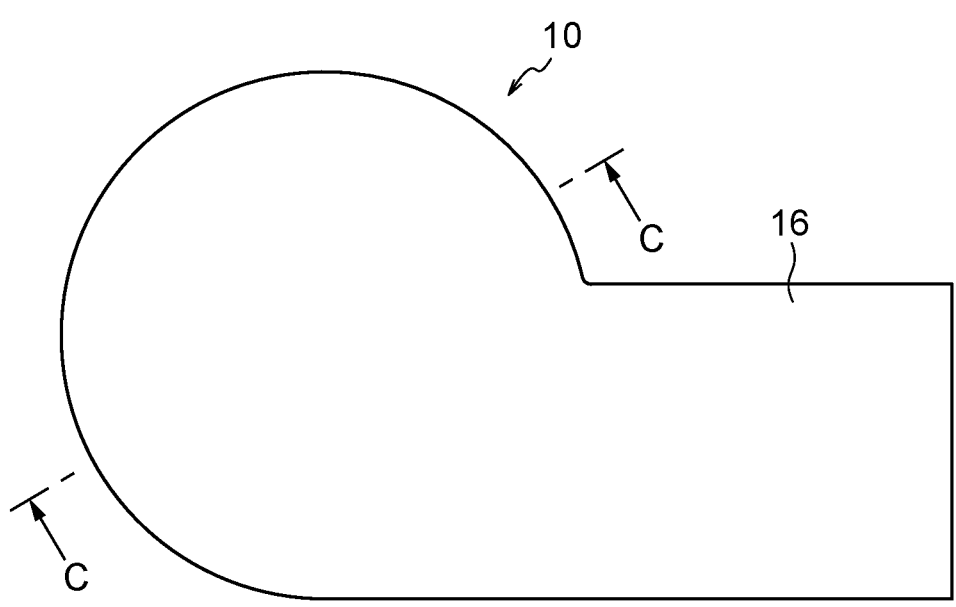
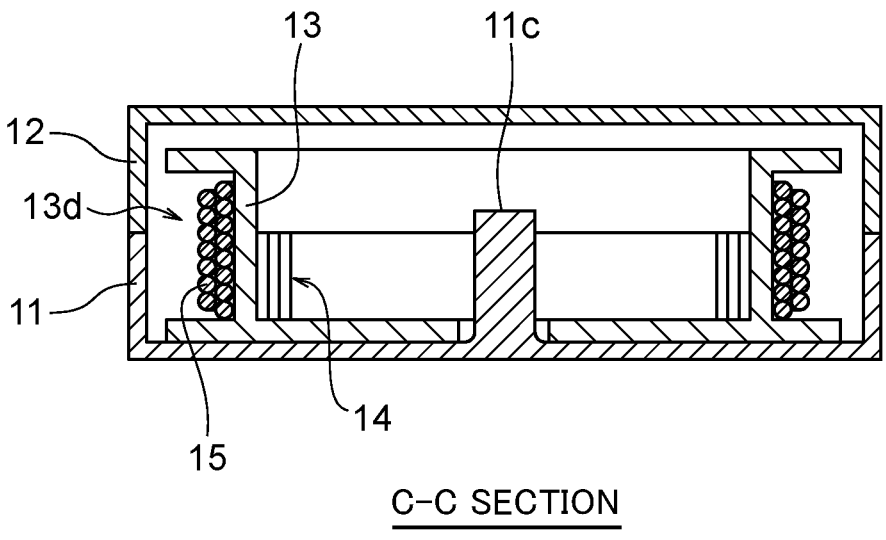
C-C SECTION
FIG.7

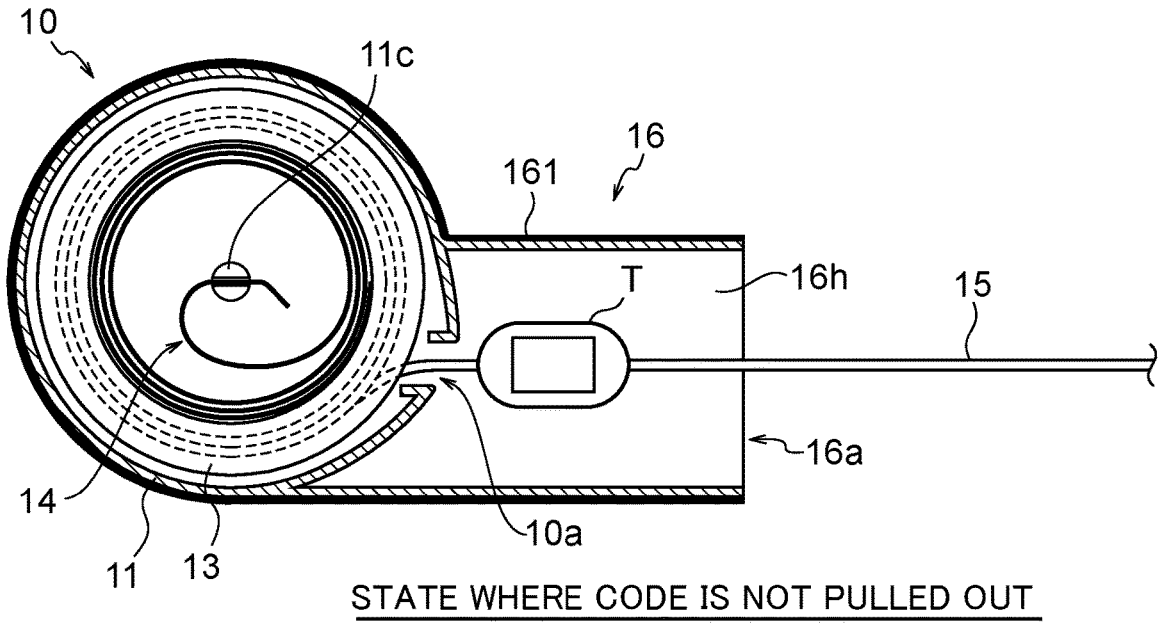
STATE WHERE CODE IS NOT PULLED OUT
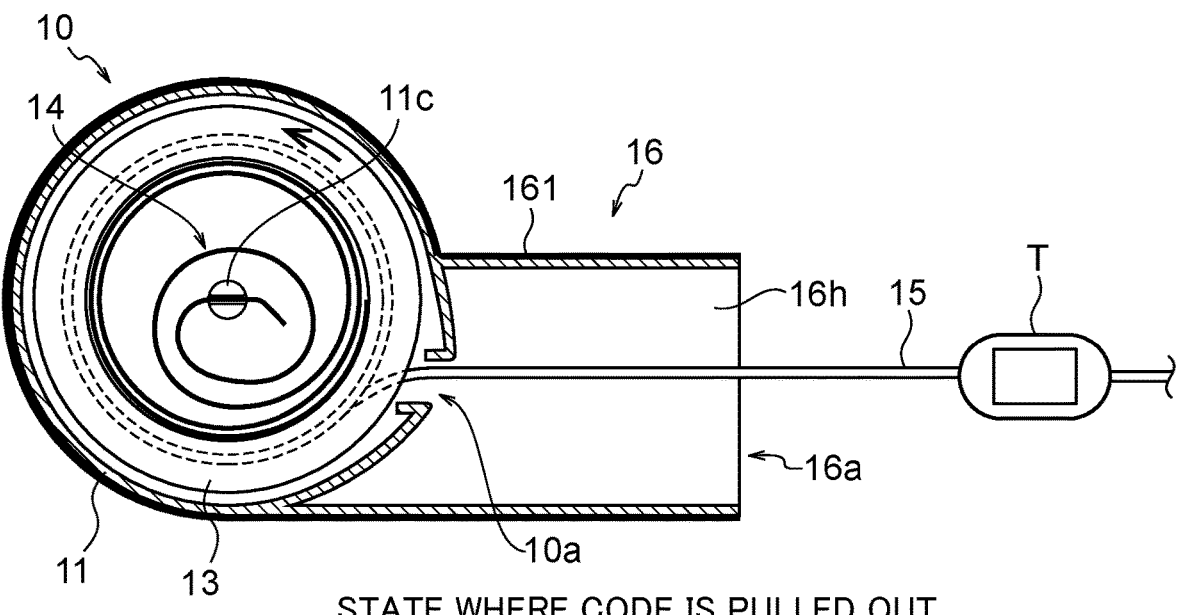
STATE WHERE CODE IS PULLED OUT
FIG.8

| TAG ID | PRODUCT CODE |
|--------|--------------|
| 123456789 | 7-1xxx |
| 132548769 | 7-2xxx |
| 864201357 | 7-3xxx |
| 135796842 | 7-4xxx |
| ⋮ | ⋮ |

TAG DATABASE

FIG.12

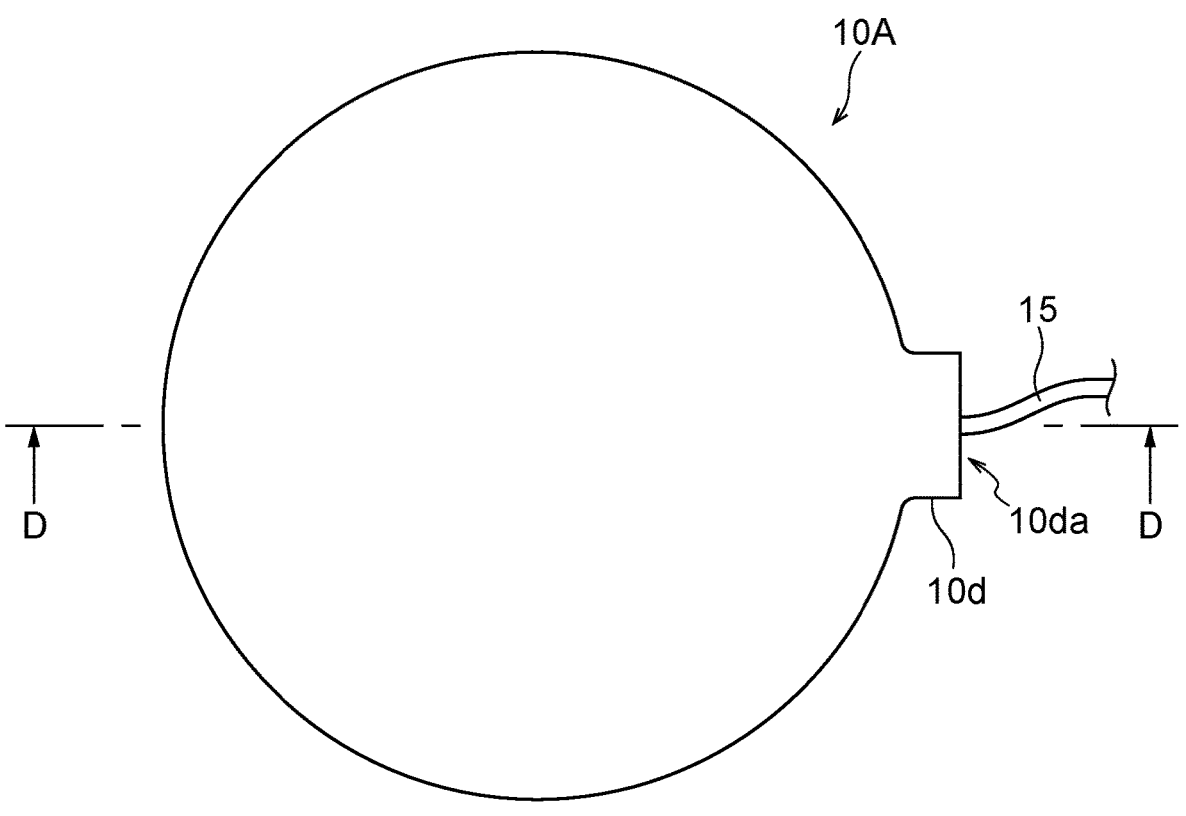
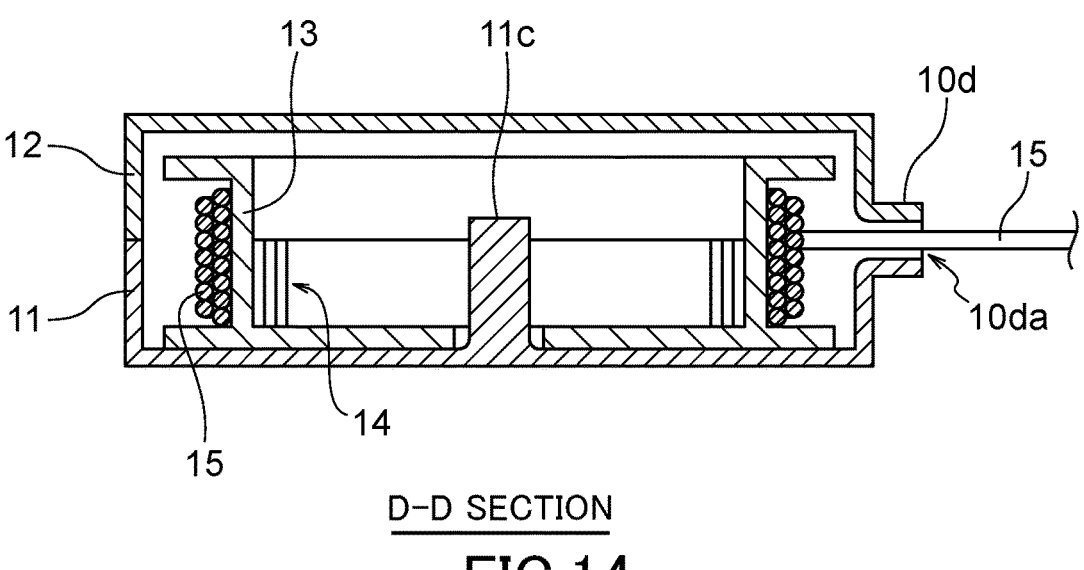
D-D SECTION
FIG.14

STATE WHERE CODE IS NOT PULLED OUT

STATE WHERE CODE IS PULLED OUT

STATE WHERE CODE IS NOT PULLED OUT

STATE WHERE CODE IS PULLED OUT

ITEM MANAGING APPARATUS, ITEM MANAGING SYSTEM, AND ITEM MANAGING METHOD

FIELD

The present invention relates to an item managing apparatus, an item managing system, and an item managing method.

BACKGROUND

For the purpose of product marketing or the like, a conventionally known system is configured to detect that a customer has picked up a product sample placed in a store.

For example, Japanese Patent Application Laid-Open Publication No. 2005-148884 describes a system in which non-contact IC tags are attached to product samples, the product samples are displayed on a product display shelf, and an IC tag reader having a structure able to communicate with the non-contact IC tags is provided. When the product sample is taken out from the product display shelf, unique information read so far by the IC tag reader becomes unable to be received. Thereby, an information processing device in the system detects that the product sample has been picked up by a shopper.

BRIEF SUMMARY

Technical Problem

Generally, a time period during which a product sample is not picked up by shoppers in a store is much longer than a time period during which a product sample is picked up by a shopper. Thus, in the above-described conventional system, for a very long time period during which the product is not picked up by shoppers, the IC tag reader continues to receive the unique information from the non-contact IC tag attached to the product sample, and the information processing device constantly monitors whether the unique information becomes unable to be received. Accordingly, there is concern that a data amount required for communication between the IC tag reader and the information processing device in the system becomes enormous, thereby causing a shortage of line capacity. Further, data received by the information processing device for a very long time period during which the product sample is not picked up by shoppers do not contribute to marketing analysis of the product.

In view of the above, an object of the present invention is to provide an item managing apparatus, an item managing system, and an item managing method that are used for automatically measuring a frequency at which an item is picked up, while reducing data required for communication.

Solution to Problem

An aspect of the present invention provides an item managing apparatus including:

an item attachment device including a linear member and a biasing member, the linear member including one end that is attached to an item, the biasing member biasing the linear member from the one end in a first direction;

a communication device attached to the linear member; and a device accommodation part that can accommodate the communication device, the device accommodation part being configured to exert an electromagnetic shielding function for the communication device when the communication device is accommodated in the device accommodation part, wherein when no external force is applied to the item against biasing force of the first direction generated by the biasing member, the communication device is accommodated in the device accommodation part, and when external force is applied to the item against the biasing force of the first direction generated by the biasing member, the communication device is enabled to exit from the device accommodation part.

Advantageous Effects

An aspect of the present invention can provide an item managing apparatus, an item managing system, and an item managing method that are used for automatically measuring a frequency at which an item is picked up, while reducing data required for communication.

BRIEF DESCRIPTION OF DRAWINGS

FIG. 4 illustrates a first example of a method for attaching the IoT tag to the code.

FIG. 6 illustrates a third example of a method for attaching the IoT tag to the code.

FIG. 7 is a diagram illustrating a structure of a cord winding device in the product managing system according to the first embodiment.

FIG. 8 illustrates sectional views of the cord winding device illustrated in FIG. 7 in a state where the cord is not pulled out and in a state where the cord is pulled out.

FIG. 12 illustrates a data configuration example of a tag database.

FIG. 14 illustrates a structure of a cord winding device in the product managing system according to the second embodiment.

DETAILED DESCRIPTION

Figure 1:
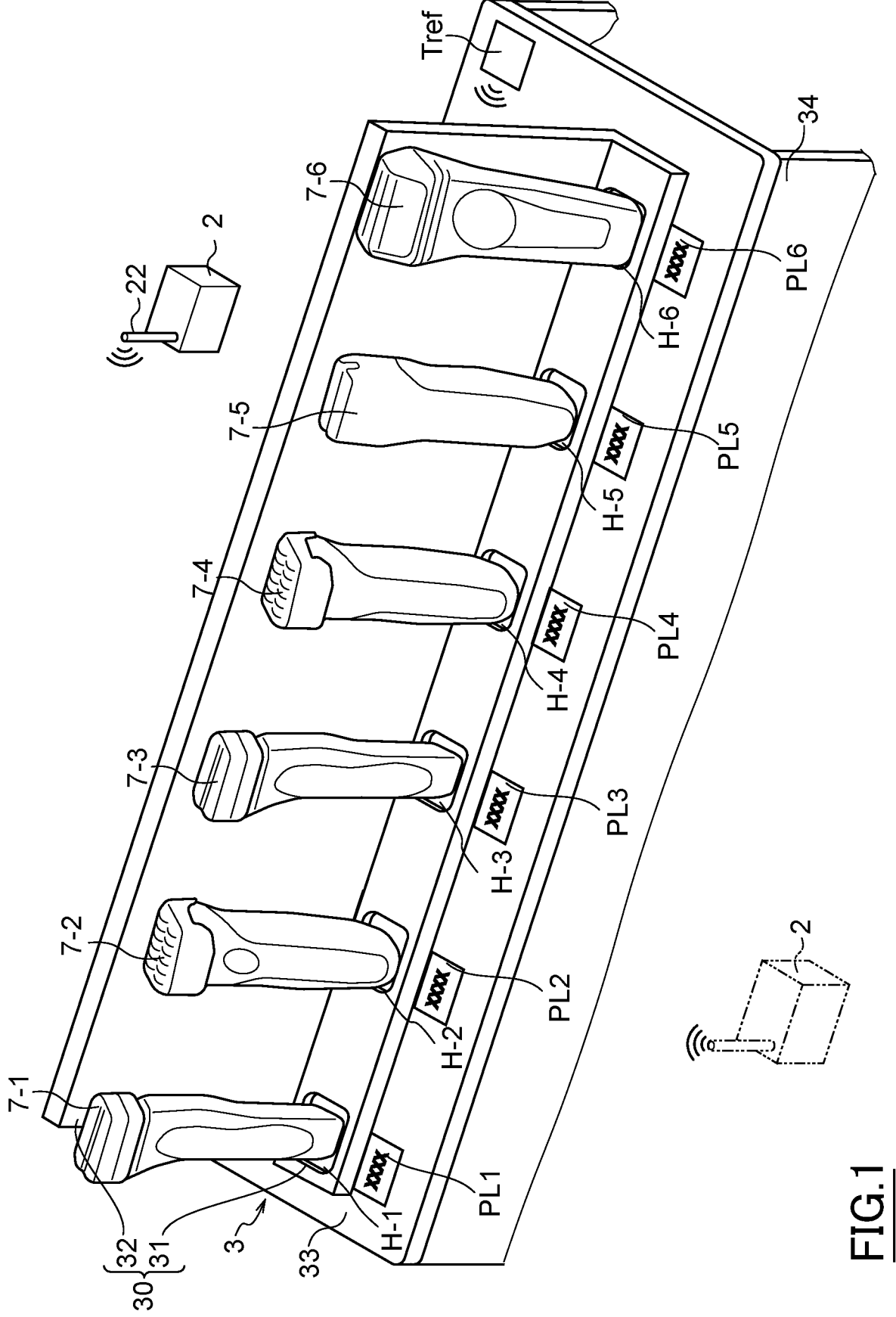
FIG. 1 illustrates an application example of a product managing system according to a first embodiment, and illustrates a state where products are placed on a product shelf.

In the present disclosure, "item" means a tangible object such as a product, a manufactured item, a semi-manufactured item (an item at an intermediate stage in course of being manufactured), or a mock-up. One example of an item cited in the following embodiments is a sales promotion product (referred to also as a point-of-sale material (POSM)).

The following describes an item managing system that is one embodiment of an information processing system according to the present disclosure.

In the product managing system according to the one embodiment, a sales promotion product (POSM) is arranged in a store to be allowed to be tried out. The product managing system is configured in such a way as to automatically measure a time point and a frequency at which a customer picks up the sales promotion product, thereby efficiently acquiring useful marketing information.

The sales promotion product (hereinafter, referred to simply as "product") is, but not limited to, preferably a product that customers feel like picking up and try out. The sales promotion product is, but not limited to, an electric shaver, a digital camera, a video camera, or a smartphone, for example. The applicable products can widely include stationery such as a pencil case and a fountain pen, a perfume, cosmetics such as a lipstick and a foundation, a portable game console, home appliances such as a handy cleaner, a laundry softener, and even a fragrance sample.

In order to automatically measure how often customers pick up the product held by a holder (or detach the product from the holder), the inventors has conceived an idea of a configuration in which a communication device transmits a signal when a customer picks up the product, and radio waves from the communication device are shielded when the product is returned to the holder.

In other words, the communication device and a shield member are provided and configured as follows. The communication device is attached to the product (item). The shield member shields radio waves from the communication device. When the product moves from a position of being placed (held) at the holder to a position of being detached from the holder, the communication device moves from a first position to a second position. When the communication device is at the first position, the shield member shields radio waves from the communication device. When the communication device is at the second position, the communication device is enabled to make communication.

In the product managing system according to the one embodiment, a linear member such as a cord or a string is attached to the product, and the communication device is attached to the linear member. When the product is detached from the holder or when the product is returned to the holder, the linear member and the communication device attached to the linear member move in such a way as to interlock with movement of the product. The communication device is configured in such a way that when the product is held by the holder, the communication device is located at a position where the communication device is shielded.

A wireless device for communicating with the communication device is arranged within a communicable range of the communication device.

The communication device is preferably an IoT tag (one example of a wireless tag) from a standpoint of being usable for a long term without maintenance. The IoT tag collects surrounding radio waves and converts the collected radio waves into electric power, and includes a capacitor storing the electric power. However, the communication device is not limited to this, and may be an RFID tag (one example of the wireless tag). The RFID tag operates in the UHF band, the HF band, or the microwave band. In each of these cases, the RFID tag may be a passive type (one that does not include an incorporated battery) or an active type (one that includes an incorporated battery).

In the one embodiment of the product managing system, a device accommodation part is attached to the linear member. The device accommodation part has an electromagnetic shielding function. The device accommodation part and the communication device attached to the linear member constitute a configuration for determining whether the product has been picked up by a customer and thereby removed from the holder. In other words, when the product is held by the holder, the communication device is accommodated in the device accommodation part. Thus, the electromagnetic shielding function is exerted for the communication device, resulting in a significant reduction in radio wave emission performance of the communication device. Accordingly, the communication device and the wireless device cannot communicate with each other, or a frequency of the communication between the communication device and the wireless device is significantly reduced. Meanwhile, when the product is not held by the holder (i.e., when a customer picks up the product), the communication device exits from the device accommodation part in such a way as to interlock with the movement of the linear member. Thus, the electromagnetic shielding function of the device accommodation part is no longer exerted for the communication device. Accordingly, the communication device and the wireless device can communicate with each other.

In the one embodiment of the product managing system, when the wireless device can communicate with the communication device, the wireless device receives identification information (e.g., the below-described tag ID) identifying the communication device, and communicates the received identification information to a server via the network. Thereby, the server can determine that the product to which the communication device associated with the identification information is attached has been picked up. Thus, the server measures a frequency at which the identification information is received, and can thereby acquire information concerning the frequency at which customers pick up the associated product.

During a period in which the product is not picked up by a customer, the communication device and the wireless device cannot communicate with each other, or a frequency of the communication between the communication device and the wireless device is significantly reduced. Thus, almost no communication occurs between the wireless device and the server. Accordingly, this system can significantly reduce data required for the communication in a case of automatically measuring a frequency at which the product is picked up.

The following describes the product managing system according to the one embodiment in more detail with reference to the drawings, using an electric shaver as an example of the product.

Figure 2:
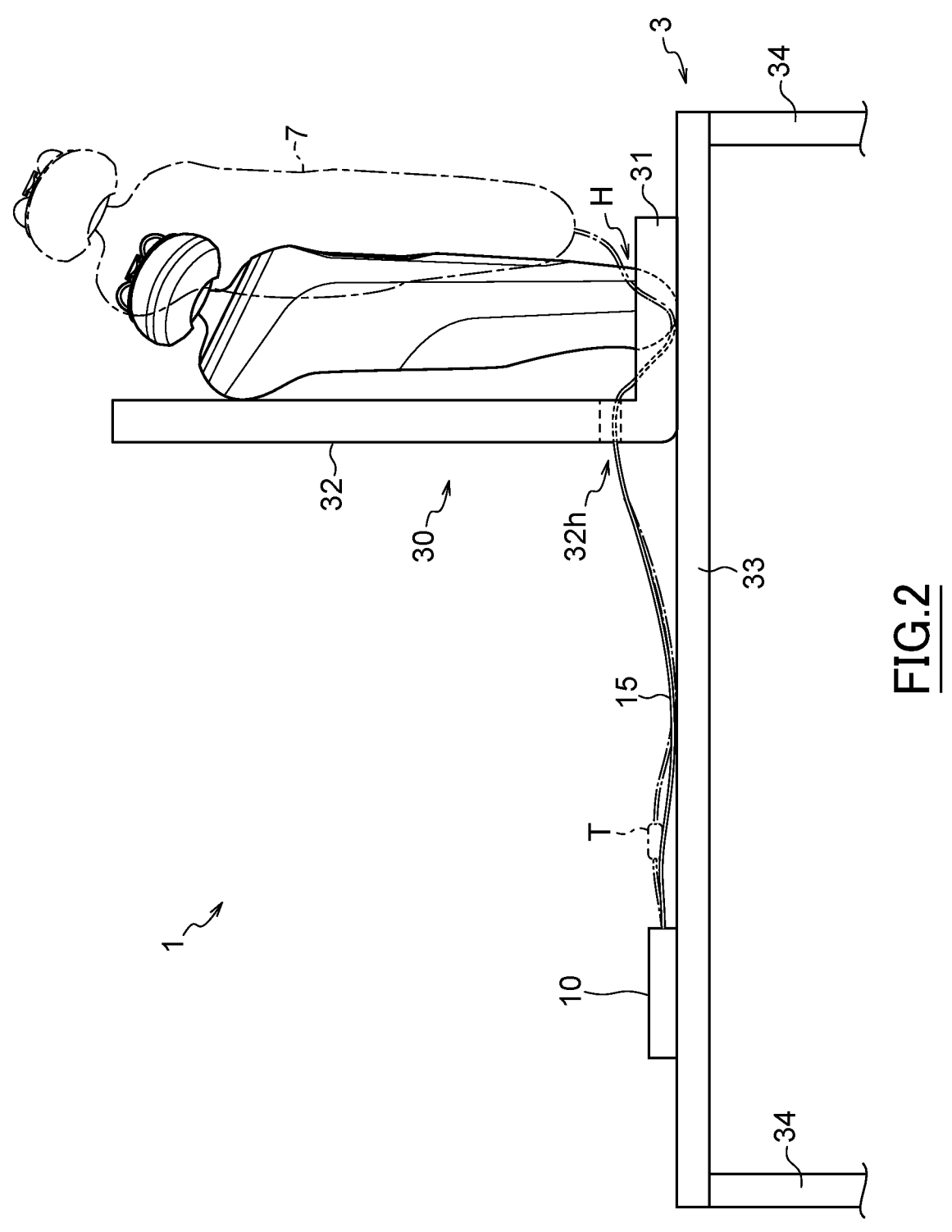
FIG. 2 is a side view of the state where the products are placed on the product shelf, in the system application example illustrated in FIG. 1.

FIG. 1 illustrates a state where six electric shavers as POSM products 7-1 to 7-6 are displayed on a product shelf 3 in such a way that the electric shavers are allowed to be tried out. FIG. 2 is a side view of the product shelf 3 on which the products are placed. In the following description, the products 7-1 to 7-6 are noted as "products 7" when the products 7-1 to 7-6 are referred to in common.

As illustrated in FIG. 1, the six products 7-1 to 7-6 are accommodated in recesses H-1 to H-6 provided in the holders 30 of the product shelf 3, respectively. Labels PL1 to PL6 are arranged near the respective holders, for product explanation to customers. In the following description, the recesses H-1 to H-6 are noted as "recesses H" when the recesses H-1 to H-6 are referred to in common.

FIG. 2 illustrates the one product 7 in a comparative manner in a state (solid lines) where the product 7 is held by the holder 30 and in a state (imaginary lines) where the product 7 is detached from the holder 30.

As illustrated in FIG. 2, the product shelf 3 includes legs 34, a base 33 supported by the legs 34, and the holder 30 fixed onto the base 33.

The holder 30 includes a support portion 31 and a backrest portion 32. The support portion 31 is provided for supporting a bottom of the product 7. The recess H is formed on the support portion 31. The backrest portion 32 is a plate-shaped member that extends upward from the support portion 31. The backrest portion 32 can support a back portion of the product 7.

As illustrated in FIG. 2, one end of a cord 15 (one example of the linear member) is attached to the bottom of the product 7. The other end of the cord 15 is attached to a cord winding device 10 (one example of an item attachment device). In the one embodiment, the cord winding device 10 is fixed to the base 33 of the product shelf 3. The fixing method is not limited, and may be any of known fixing methods including fastening by a double-sided tape, an adhesive, or a screw, for example.

The cord 15 and the cord winding device 10 are provided for each product 7. Accordingly, when the six products 7 are displayed as illustrated in FIG. 1, six sets of the cord 15 and the cord winding device 10 are provided.

In the one embodiment, the cord winding device 10 and the tag T constitute an item managing apparatus.

The cord winding device 10 can pull out and wind the cord 15 in such a way as to be extendable and retractable. A length of the cord 15 is set to an extent that allows a customer to sufficiently try out the product 7 when the customer picks up the product 7. When a customer picks up the product 7 at the holder 30, the cord 15 is pulled out from the cord winding device 10, and the product 7 can be detached from the holder 30 in a state where the cord 15 is attached to the product 7. When the product 7 is returned to the holder 30, the cord 15 is wound by the cord winding device 10.

As illustrated in FIG. 2, the Internet-of-things (IoT) tag T (one example of the communication device) is attached to the cord 15. The IoT tag is one example of an energy-harvesting communication device that generates electric power based on radio waves in a surrounding environment.

The IoT tag does not include a battery. In the following description, the IoT tag T is referred to simply as the tag T.

The tag T stores tag ID that differs for each product 7 connected to the cord 15 to which the tag T is attached. The tag ID is identification information of the tag T.

The maximum communication distance of the tag T is, but not limited to, a value in a range from 3 meters to 10 meters, for example. The tag T is configured to make wireless communication with low electric power consumption. Examples of a communication protocol for the tag T include Bluetooth (registered trademark) Low Energy (hereinafter, BLE), Bluetooth (registered trademark), and ZigBee (registered trademark). The following describes an exemplified case where the communication is made by BLE.

When the tag T is based on the standard of BLE, the tag T broadcasts an advertising packet (described below) at a predetermined interval (e.g., every short period of approximately 1 second to approximately 10 seconds). The packet transmitted by the tag T includes the tag ID.

As illustrated in FIG. 1, the wireless device 2 for making BLE communication with each of the tags T1 to T6 is placed near the product shelf 3. As described below, the wireless device 2 is a gateway device that can communicate with a tag management server (described below) via a network. As illustrated in FIG. 2, the wireless device 2 is arranged at a position where the wireless device 2 can receive packets transmitted from the respective tags in cases where the products are not arranged at the respective holders. In other words, the wireless device 2 is arranged by taking into consideration a radio wave output of each of the tags.

As the wireless device 2 is depicted by the imaginary lines in FIG. 1, an installation location of the wireless device 2 can be set arbitrarily.

As illustrated in FIG. 1, a reference tag Tref is preferably arranged on the product shelf 3. The reference tag Tref is a tag for reference, and is a device having the same configuration as that of each of the tags T1 to T6.

The reference tag Tref may be arranged at any location as long as the reference tag Tref can communicate with the wireless device 2 regardless of whether the product 7-1 to 7-6 are held by the associated holders. The reference tag Tref is provided for determining whether the wireless device 2 is operating normally. Particularly, as described below, in a state where all of the products 7-1 to 7-6 are held by the holders, the wireless device 2 cannot receive radio waves emitted from the tags T1 to T6 in some cases, and thus, it is difficult to determine whether the system is operating normally, if the reference tag Tref is not provided. In view of it, the reference tag Tref that can communicate with the wireless device 2 regardless of whether the products 7-1 to 7-6 are held by the associated holders is provided. Thereby, it can be determined whether the system is operating normally.

Figure 3:
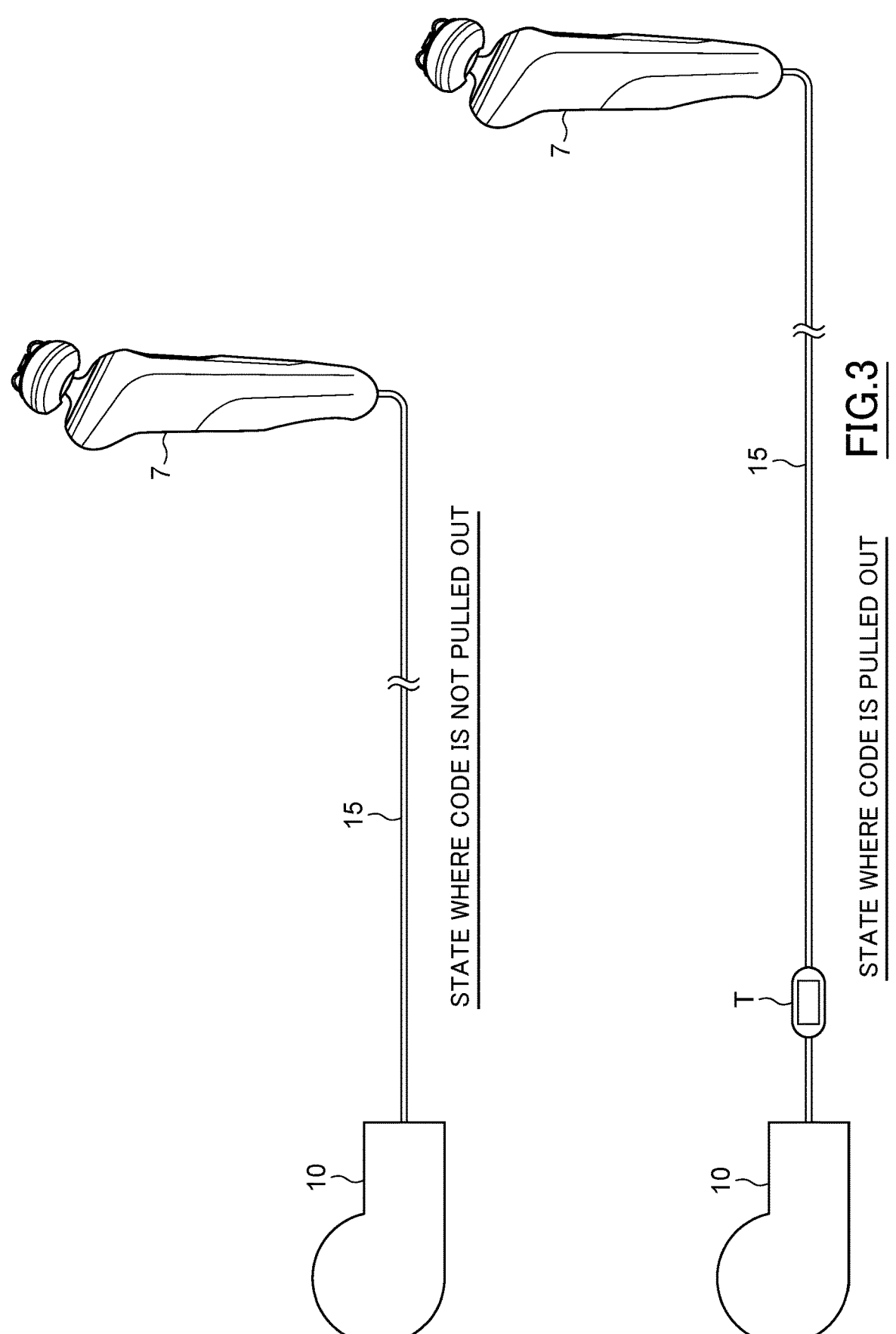
FIG. 3 illustrates positional relations between an IoT tag and the product in a state where a cord is not pulled out and in a state where the cord is pulled out, in the product managing system according to the first embodiment.

FIG. 3 illustrates positional relations between the tag T and the product 7 in a state where the cord 15 is not pulled out from the cord winding device 10 and in a state where the cord 15 is pulled out.

When the product 7 is held by the holder 30, the cord 15 is wound around the cord winding device 10, and the tag T attached to the cord 15 is accommodated in the cord winding device 10. Meanwhile, when the product 7 is detached from the holder 30, the cord 15 is pulled out from the cord winding device 10, and the tag T attached to the cord 15 becomes exposed.

Next, a method for attaching the tag T to the cord 15 will be described with reference to FIG. 4 to FIG. 6.

FIG. 4 illustrates a first example of a method for attaching the tag T to the cord 15.

In the first example of the attachment method for the tag T, as illustrated in FIG. 4, a tag body 62 is attached to a front side of a plate 61, and the cord 15 is attached to a back side of the plate 61 by a seal 63. Thereby, the tag T is attached to the cord 15. The plate 61 is made of plastic, for example, but is not limited to this, and may be made of wood or paper.

As illustrated in the A-A section in FIG. 4, the seal 63 includes a base material 631 and an adhesive 632 that are layered on each other. The adhesive 632 adheres the cord 15 to the plate 61.

As illustrated in the A-A section in FIG. 4, the tag body 62 includes a base material 621, a communication device 64, and an adhesive 623 that are layered on each other in this order. The adhesive 623 adheres the tag body 62 to the plate 61. The communication device 64 is constituted by an IC chip and a film-shaped antenna that are not illustrated.

Figure 5:
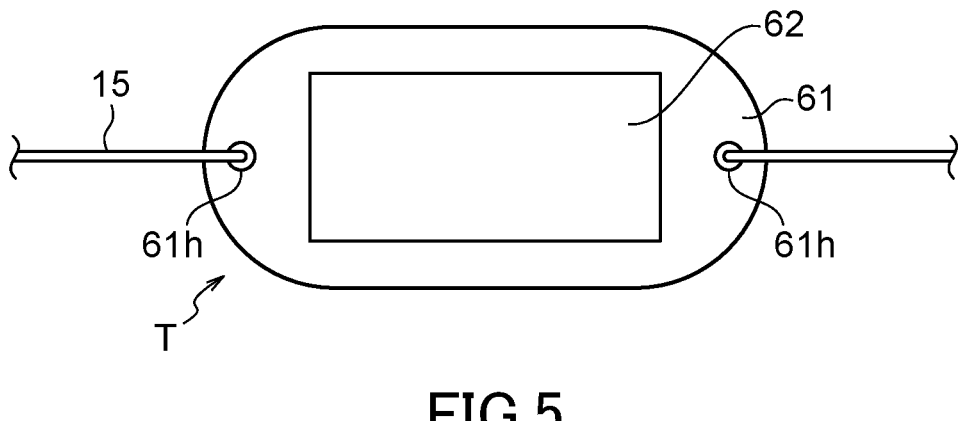
FIG. 5 illustrates a second example of a method for attaching the IoT tag to the code.

FIG. 5 illustrates a second example of the method for attaching the tag T to the cord 15. A difference from the first example lies in that the tag T is attached to the cord 15 by coupling the cord 15 in holes 61h provided in the plate 61, instead of fixing the cord 15 to the back side of the plate 61 by the seal.

FIG. 6 illustrates a third example of the method for attaching the tag T to the cord 15.

In the third example of the attachment method for the tag T, as illustrated in the B-B section in FIG. 6, integrated base materials 65a and 65b are bonded to each other by an adhesive 66 while the communication device 64 and the cord 15 are sandwiched between the integrated base materials 65a and 65b. The integrated base materials 65a and 65b are included in an original base material that is line-symmetrical with respect to the perforation. The adhesive 66 is applied to a surface on one side in the original base material. The original base material is folded inward at the perforation to sandwich the cord 15 and the communication device 64. Thereby, the tag T is attached to the cord 15. The adhesive may be applied to both of the base materials 65a and 65b.

The tag T in FIG. 6 may be reinforced by pouch processing (lamination processing).

Next, a configuration of the cord winding device 10 will be described with reference to FIG. 7.

FIG. 7 illustrates a plan view of the cord winding device 10 and the C-C sectional view. FIG. 2 illustrates the cord winding device 10 that is placed directly on the base 33 of the product shelf 3 and that is viewed from a side of the cord winding device 10.

As illustrated in the C-C section, the cord winding device 10 includes a cord winding portion 13 and a spiral spring 14. The cord winding portion 13 and the spiral spring 14 are provided in an accommodation space defined by a lower case 11 and an upper case 12. The cord winding portion 13 is configured to be rotatable around a spring support portion 11c. The spring support portion 11c protrudes from the center of a bottom of the lower case 11. One end of the cord 15 is attached to the cord winding portion 13. An outer peripheral groove 13d for winding the cord 15 is formed on the cord winding portion 13.

The cord winding portion 13 and the spiral spring 14 (one example of a biasing member) constitute a winding mechanism.

One end of the spiral spring 14 is supported by the spring support portion 11c. When the cord winding portion 13 rotates around the spring support portion 11c and the cord 15 is pulled out, the spiral spring 14 is wound up. Thus, when the cord 15 is pulled out, the biasing force is generated in a direction of winding the cord 15. This biasing force acts in a direction (one example of a first direction) toward the cord winding device 10 from the one end included in the cord 15 and attached to the item 7.

FIG. 8 illustrates plan views of the cord winding device 10 in a state where the cord 15 is not pulled out and in a state where the cord 15 is pulled out. FIG. 8 illustrates sections of the cord winding device 10.

As illustrated in FIG. 8, a cord entrance 10a is formed inside the cord winding device 10. The cord entrance 10a is provided for pulling out and winding the cord 15. The cord winding device 10 includes an accommodation part 16 (one example of the device accommodation part) for accommodating the tag T. The accommodation part 16 has a rectangular cross section, for example. The accommodation part 16 includes a cavity 16h formed to communicate with the cord entrance 10a. The accommodation part 16 includes an opening 16a formed on an opposite side of the cord entrance 10a. The tag T enters the cavity 16h through the opening 16a or exits from the cavity 16h, depending on a pulled-out state of the cord 15.

The cord winding device 10 includes an outer surface covered with an electromagnetic shield layer 161. The electromagnetic shield layer 161 (shield member) includes, for example, a transparent PET film, an aluminum vapor-deposition layer (film), a base material, and an adhesive layer that are layered on each other in this order. The electromagnetic shield layer 161 is attached to the outer surface of the accommodation part 16 by the adhesive. The electromagnetic shield layer 161 may be foil paper that has curved-surface conformability and that is attached to the outer surface of the accommodation part 16. Alternatively, the electromagnetic shield layer 161 may be aluminum foil with which the outer surface of the accommodation part 16 is wrapped.

The electromagnetic shield layer 161 is provided to function as an electromagnetic shield for the tag T when the tag T is accommodated in the accommodation part 16.

Next, operation of the product managing system 1 will be described.

When the product 7 is set in the holder 30, the cord 15 is in a state of being not pulled out, as illustrated in FIG. 8. In this state, the spiral spring 14 is not wound up, and restoring force of the spiral spring 14 does not act on the cord 15 or slightly acts on the cord 15. In this state, the tag T attached to the cord 15 is accommodated in the accommodation part 16 of the cord winding device 10. Thus, due to the effect of the electromagnetic shield layer 161, the tag T cannot communicate with the wireless device 2, or even if it can, a frequency of the communication of the tag T with the wireless device 2 is small.

Meanwhile, when the product 7 is detached from the holder 30, the cord 15 is brought into a state of being pulled out from the cord winding device 10. In this state, the cord 15 is pulled out and the spiral spring 14 is wound up, and the restoring force F of the spiral spring 14 acts in a direction of winding the cord 15. In this state, the tag T moves together with the product 7, and the tag T exits from the opening 16a of the accommodation part 16 and becomes exposed (the tag T moves as far as a position where the tag T is not influenced by the electromagnetic shield layer 161). Thus, the tag T is not influenced by the effect of the electromagnetic shield layer 16. Accordingly, the tag T can communicate with the wireless device 2, or becomes able to frequently communicate with the wireless device 2.

When the product 7 is returned to the holder 30, the restoring force F of the spiral spring 14 acts in the direction of winding the cord 15. Thereby, the tag T is moved into the accommodation part 16 of the cord winding device 10 as the cord 15 moves in the winding direction.

Figure 9:
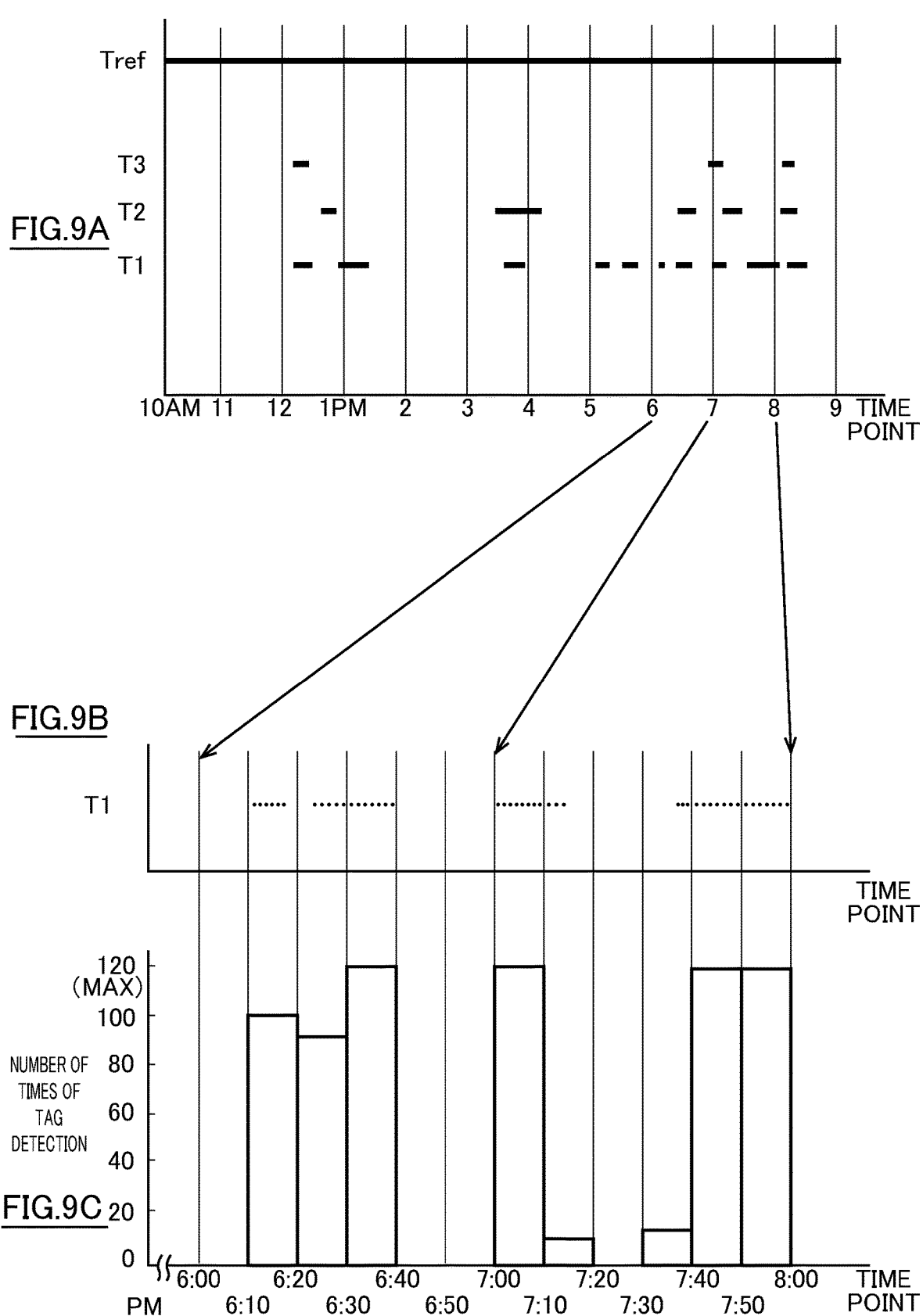
FIGS. 9A-9C illustrate an example of the totaled numbers of detection times of the tag within predetermined periods.

FIG. 9 represents exemplary measurement results for how frequently the wireless device 2 detects a packet from the tags T.

FIG. 9A is a diagram in which points are plotted at timings when the wireless device 2 detects packets from the tags T1 to T3 and the reference tag Tref, within opening hours (10 a.m. to 9 p.m.) of a store in one day.

FIG. 9B is an enlarged view of a part in which the points are plotted at the timings when the wireless device 2 detects packets from the tag T1 and that covers the two-hour period from 6 p.m. to 8 p.m. included in the opening hours of the store illustrated in FIG. 9A.

FIG. 9C corresponds to FIG. 9B. FIG. 9C represents the number of times the tag T1 was detected (i.e., the number of times the product 7-1 associated with the tag T1 was detached from the holder 30). This number of times was counted every 10 minutes over the two-hour period from 6 p.m. to 8 p.m. included in the opening hours of the store.

For example, when a packet is transmitted from the tag T1 at a five-second interval, the wireless device 2 receives the packet from the tag T1 (i.e., detects the tag T1) every five seconds while the product 7 is detached from the holder 30. FIG. 9C represents the number of times the tag T1 was detected. This number of times was totaled every 10 minutes. In this example, the tag was detected 100 times in the 10 minutes from 6:10 p.m. to 6:20 p.m., and thus, a customer picked up the product 7-1 for 500 seconds (=100×5 seconds).

The totaling processing as illustrated in FIG. 9C is performed in the tag management server (described below) connected to the wireless device 2.

FIG. 9A to FIG. 9C represent an ideal case. In this ideal case, while the product 7 is held by the holder 30, the tag T is completely shielded by being accommodated in the accommodation part 16 of the cord winding device 10, and the tag T and the wireless device 2 cannot communicate with each other. However, in some cases, even while the product 7 is held by the holder 30, the tag T and the wireless device 2 can communicate with each other per long time period, via the opening 16a of the accommodation part 16. For example, on the assumption that a packet is transmitted at a five-second interval while the tag T is exposed from the accommodation part 16, there is a case where the tag T and the wireless device 2 can communicate with each other per time period (e.g., several minutes to several hours) longer than five seconds while the tag T is accommodated in the accommodation part 16.

In view of it, when the wireless device 2 receives a packet at an interval shorter than a predetermined threshold value, it may be determined that the tag T has been detected. For example, the predetermined threshold value is set as a value slightly larger than an interval at which the tag T transmits a packet while the tag T is exposed from the accommodation part 16.

Next, a configuration of each device in the product managing system 1 according to the one embodiment will be described with reference to FIG. 10 and FIG. 11.

Figure 10:
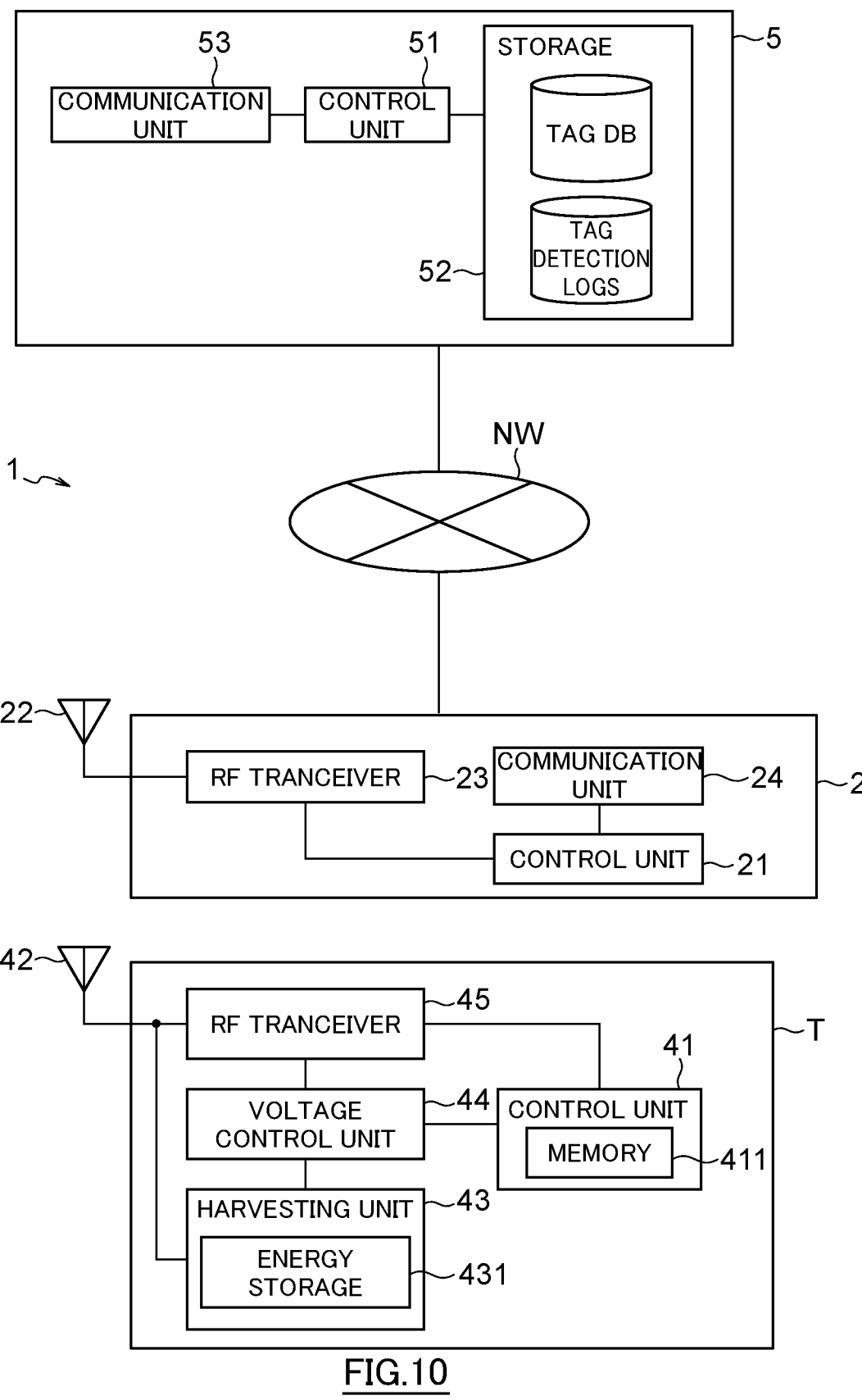
FIG. 10 illustrates an internal configuration of each device in the product managing system according to the first embodiment.

FIG. 10 is a block diagram illustrating an internal configuration of each device in the product managing system 1 according to the present embodiment. FIG. 11 is a diagram illustrating a configuration of an advertising packet transmitted from the tag T.

As illustrated in FIG. 10, the product managing system 1 includes the wireless device 2 and the tag management server 5 (one example of a measurement device). The tag management server 5 can communicate with the wireless device 2 via the network NW. The network NW is, but not limited to, a local area network (LAN), a wide area network (WAN), a mobile communication network, the Internet, or the like, for example.

The wireless device 2 functions as a BLE wireless terminal that receives packets from the tag T and the reference tag Tref by the BLE communication. When the wireless device 2 receives a packet from each of the tags, the wireless device 2 transmits the tag ID included in the received packet to the tag management server 5.

When the tag T and the reference tag Tref are in a state of being able to normally transmit packets, the tag T and the reference tag Tref each transmit a packet at a predetermined interval as described above. In response to this, the wireless device 2 also transmits the tag ID to the tag management server 5 at the predetermined interval.

Referring to FIG. 10, the tag T includes a control unit 41, an antenna 42, a harvesting unit 43, a voltage control unit 44, and an RF transceiver 45, for example. Although the following describes the configuration of the tag T, the configuration of the reference tag Tref, which is not illustrated in FIG. 10, is the same as that of the tag T.

The tag is, for example, a film-shaped member as an entire form thereof which is not illustrated. The film-shaped member includes an electrically conductive metal foil of a predetermined pattern constituting the antenna 42, and an IC chip connected to the metal foil. The control unit 41, the harvesting unit 43, the voltage control unit 44, and the RF transceiver 45 are mounted in the IC chip.

The control unit 41 includes a microprocessor and a memory 411. The control unit 41 controls the entire tag T. The memory 411 is a random-access memory (RAM) or a read-only memory (ROM). The memory 411 stores programs executed by the microprocessor, and stores the tag ID that is identification information unique to the tag T.

The harvesting unit 43 harvests electric power from radio waves (e.g., radio waves generated by the surrounding wireless communication) in the surrounding environment. The harvesting unit 43 stores the harvested electric power in an internal energy storage 431. In the present embodiment, the harvesting unit 43 converts, into a DC voltage, a radio signal received by the antenna 42 for example, and then stores the electric power in the energy storage 431. The energy storage 431 is a capacitor, for example. In the case of being the capacitor, the energy storage 431 may be one (i.e., an on-die capacitor) configured on a semiconductor chip.

Radio waves used by the harvesting unit 43 for energy harvesting are radio waves in a plurality of different frequency bands within a wide frequency band. Examples of such radio waves include radio waves generated by the wireless communication in the frequency bands used in mobile communication systems of what are called 3G to 5G and the like, radio waves generated by the wireless communication in the frequency bands used in the communication standards such as Bluetooth (registered trademark) and Wi-Fi (registered trademark), radio waves generated by the wireless communication in the 2.4-GHz band represented by the communication protocols such as ZigBee (registered trademark), Thread, and the like, and radio waves generated by the wireless communication in the frequency bands (e.g., the 900-MHz band and the 13.56-MHz band) used in the RFID.

Radio waves exemplified here are generally applicable in almost all areas. The tag T operates with electric power harvested from radio waves in the surrounding environment through energy harvesting by the harvesting unit 43. Thus, a battery does not need to be installed in the tag T, and the system cost can be reduced. No need to install a battery can eliminate work for battery replacement. Thus, there is no occurrence of a problem that the tag ID cannot be acquired even though the tag exists.

The voltage control unit 44 supplies an operation voltage to the control unit 41 and the RF transceiver 45. The voltage control unit 44 monitors a voltage of the energy storage 431, and switches a power mode, depending on the monitored result. When a voltage of the energy storage 431 is lower than a predetermined threshold value, the voltage control unit 44 sets the power mode to be a first mode of operating only the minimum circuitry. In this case, the control unit 41 and the RF transceiver 45 cease generation of a packet and transmission of a radio signal described below. When a voltage of the energy storage 431 is charged to become equal to or higher than the predetermined threshold value, the voltage control unit 44 sets the power mode to be a second mode of executing a normal processing routine. In this case, the control unit 41 and the RF transceiver 45 perform various pieces of processing including generation of a packet and transmission of a radio signal.

When the power mode is the second mode, the control unit 41 generates an advertising packet in accordance with the BLE protocol.

The advertising packet is a packet that is transmitted through advertising channels to implement broadcast communication in BLE. The advertising packet has the packet configuration illustrated in FIG. 11.

Figure 11:
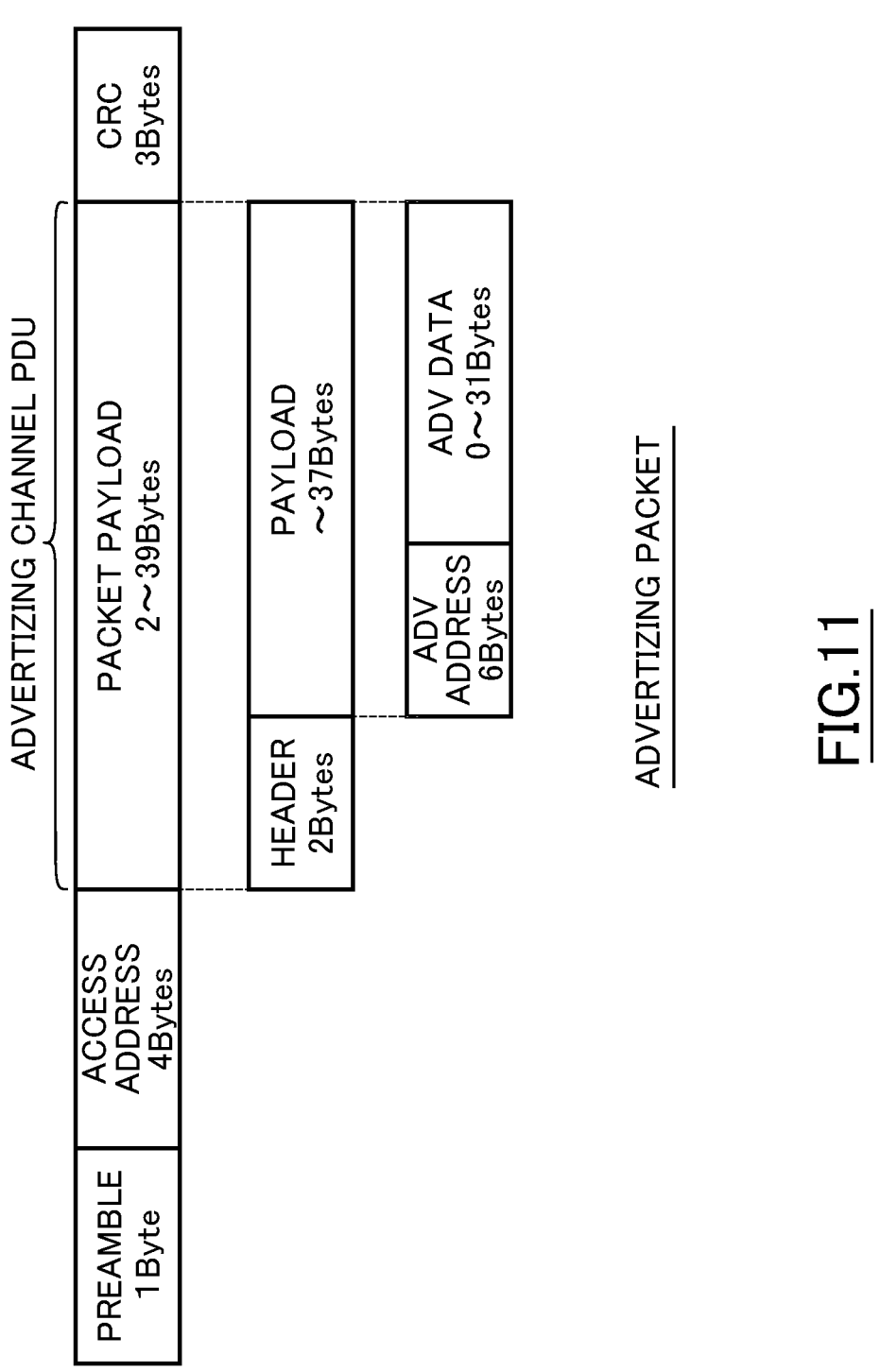
FIG. 11 illustrates a configuration of an advertising packet transmitted from the IoT tag.

In FIG. 11, the preamble and the address access are respective predetermined fixed values. The CRC is a cyclic check code, and is check data calculated by use of a predetermined generation polynomial targeting a packet payload (i.e., the advertising channel protocol data unit (PDU)).

The advertising channel PDU (hereinafter, referred to simply as "PDU") is constituted of a header and a payload. The payload is constituted of an ADV address and ADV data. The ADV address is an address of an advertiser (i.e., the tag T that is an entity making notification). However, the ADV address may be a random value set at each time of transmission to prevent the sender from being identified. The ADV data are data (broadcast data) of the advertiser, and include the tag ID.

The control unit 41 preferably encrypts the PDU. A method used for the encrypting is, but not limited to, for example, the advanced encryption standard (AES) whose key length is 128 bits.

The RF transceiver 45 applies predetermined digital modulation (e.g., the Gaussian frequency shift keying (GFSK)) to a transmission-target packet (baseband signal). Then, the RF transceiver 45 applies orthogonal modulation to the digital-modulated packet, and sends the high-frequency signal (a signal in the 2.4-GHz frequency band in a case of BLE) to the antenna 42.

The antenna 42 includes a transmission antenna and an electric power generation antenna. The transmission antenna transmits the high-frequency radio signal (packet) sent by the RF transceiver 45. Meanwhile, the electric power generation antenna receives radio waves in the surrounding environment for example to function as a rectenna in cooperation with the harvesting unit 43.

As illustrated in FIG. 10, the wireless device 2 includes a control unit 21, an antenna 22, an RF transceiver 23, and a communication unit 24.

The control unit 21 is constituted mainly by a microprocessor. The control unit 21 controls the entire wireless device 2. For example, the control unit 21 decrypts the PDU of a packet received from the tag T, and performs error detection, based on the CRC, by using the same generation polynomial as that on a side of the tag T. Then, the control unit 21 extracts the broadcast data from the PDU, and controls the communication unit 24 to transmit the extracted broadcast data to the tag management server 5.

The RF transceiver 23 demodulates the radio signal received by the antenna 22 from the tag T to convert the radio signal to the baseband signal. Then, the RF transceiver 23 applies predetermined digital demodulation to the baseband signal to receive the packet. In order to transmit a beacon signal from the antenna 22, the RF transceiver 23 applies orthogonal modulation to a baseband signal of a predetermined pattern, for example, and sends the orthogonal-modulated signal to the antenna 22.

The communication unit 24 functions as a communication interface for communicating with the tag management server 5.

As illustrated in FIG. 10, the tag management server 5 includes a control unit 51, a storage 52, and a communication unit 53, for example.

The control unit 51 is constituted mainly by a microprocessor. The control unit 51 controls the entire tag management server 5.

The storage 52 includes a large-scale storage device such as a hard disk drive (HDD). The storage 52 stores a tag database. As illustrated in FIG. 12, the tag database includes the tag ID of the tag T and the product code of the product 7 held by the recess H associated with the tag T, in such a way that the tag ID is related to the product code. The storage 52 also stores the tag ID of the reference tag Tref.

The communication unit 53 functions as a communication interface for communicating with the wireless device 2.

The control unit 51 executes a server program. Thereby, when the wireless device 2 receives packets transmitted by the tag T and the reference tag Tref and including the tag IDs, the control unit 51 acquires, from the wireless device 2, the tag IDs included in the packets.

Each time the control unit 51 acquires, from the wireless device 2, the tag ID included in the tag database, the control unit 51 records, in the storage 52, as a tag detection log, the acquired tag ID and a time point at which the control unit 51 acquires the tag ID. In other words, the control unit 51 acquires a result that concerns whether the wireless device 2 can communicate with the tag T over time. In FIG. 9A and FIG. 9B, the tag detection logs are plotted. Based on the tag detection logs, the control unit 51 performs processing of totaling the number of times the tag is detected, for each predetermined time period as illustrated in FIG. 9C. Thus, the control unit 51 measures a frequency at which the product of the specific product code is picked up by customers. At this time, the product code associated with the tag ID is identified by referring to the tag database.

A timing of performing the totaling processing can be arbitrarily set. In one example, results that concern whether the wireless device 2 can communicate with the tag T over time are recorded as tag detection logs during opening hours of the store in one day. Then, at a timing after the opening hours lapses, the totaling processing is performed based on the tag detection logs.

Similarly, each time the control unit 51 acquires the tag ID of the reference tag Tref from the wireless device 2, the control unit 51 records, in the storage 52, as a tag detection log, the acquired tag ID and a time point at which the control unit 51 acquires the tag ID. As illustrated in FIG. 1, the reference tag Tref is not shielded by the product 7. Thus, unless the wireless device 2 is malfunctioning, the control unit 51 can acquire the tag ID of the reference tag Tref at the predetermined interval at which the reference tag Tref transmits a packet. When the control unit 51 cannot acquire the tag ID of the reference tag Tref at the predetermined interval, the control unit 51 determines that the wireless device 2 is malfunctioning, and notifies an unillustrated administrator terminal of the determined result.

Although not illustrated in FIG. 10, a user terminal communicable with the tag management server 5 via the network NW preferably acquires, from the tag management server 5, results of the totaling processing based on the tag detection logs, and displays the acquired results. Thereby, a user can view the results. For example, the user terminal and the tag management server 5 communicate with each other by using the HTTPS, and thereby, a browser of the user terminal receives the display data from the tag management server 5. As a result, the results of the totaling processing in the form exemplified in FIG. 9C are displayed on a screen of the user terminal. Thereby, the user can visually recognize the information of a time point and a frequency at which each product is picked up.

As described above, according to the above-described product managing system 1, one end of the cord 15 is attached to the product 7 held by the holder 30 on the product shelf 3 in the store, and the other end of the cord 15 is attached to the cord winding device 10. The tag T is attached to the cord 15. When the product 7 is detached from the holder 30, the tag T is exposed from the cord winding device 10, and becomes able to frequently communicate with the wireless device 2. When the product 7 is held by the holder 30, the tag T is accommodated within the cord winding device 10. Accordingly, the electromagnetic shield layer prevents the communication with the wireless device 2 or reduces a frequency of the communication.

Thus, the tag management server 5 communicable with the wireless device 2 acquires, from the wireless device 2, a result of whether communication by the wireless device 2 with the tag T is possible, and measures a frequency at which the wireless device 2 becomes able to communicate with the tag T, based on the result of whether the communication is possible. Thereby, information concerning a frequency at which the associated product 7 is picked up by customers can be acquired.

Here, while the product 7 is not picked up by a customer, communication between the tag T and the wireless device 2 is almost impossible, and thus, communication between the wireless device 2 and the tag management server 5 does not occur. Accordingly, this system has an advantage that data required for communication can be significantly reduced in automatically measuring a frequency at which the product 7 is picked up.

Further, an item managing method according to the one embodiment includes the following steps:

(1) a step of providing the cord winding device 10 that includes the cord 15 having one end attached to the product 7 and that includes the spiral spring 14 biasing the cord 15 in the first direction from the one end of the cord 15;

(2) a step of attaching the tag T to the cord 15;

(3) a step of configuring the accommodation part 16 included in the cord winding device 10 and having the electromagnetic shielding function, in such a way that the tag T is caused to be accommodated in the accommodation part 16 when no external force acting against the biasing force of the spiral spring 14 is applied to the product 7;

(4) a step of causing the tag T to exit from the accommodation part 16 and communicate with the wireless device 2 when external force acting against the biasing force of the spiral spring 14 is applied to the product 7; and (5) a step of acquiring a result that concerns whether communication by the wireless device 2 with the tag T is possible over time, and measuring a frequency at which the wireless device 2 becomes able to communicate with the tag T, based on the result of whether the communication is possible.

Next, an item managing apparatus according to another embodiment will be described with reference to FIG. 13 to FIG. 15. This item managing apparatus differs from the item managing apparatus described with reference to FIG. 3, FIG. 7, and FIG. 8 in that a winding mechanism for the cord 15 and an accommodation part for the tag T are configured separately from each other.

Figure 13:
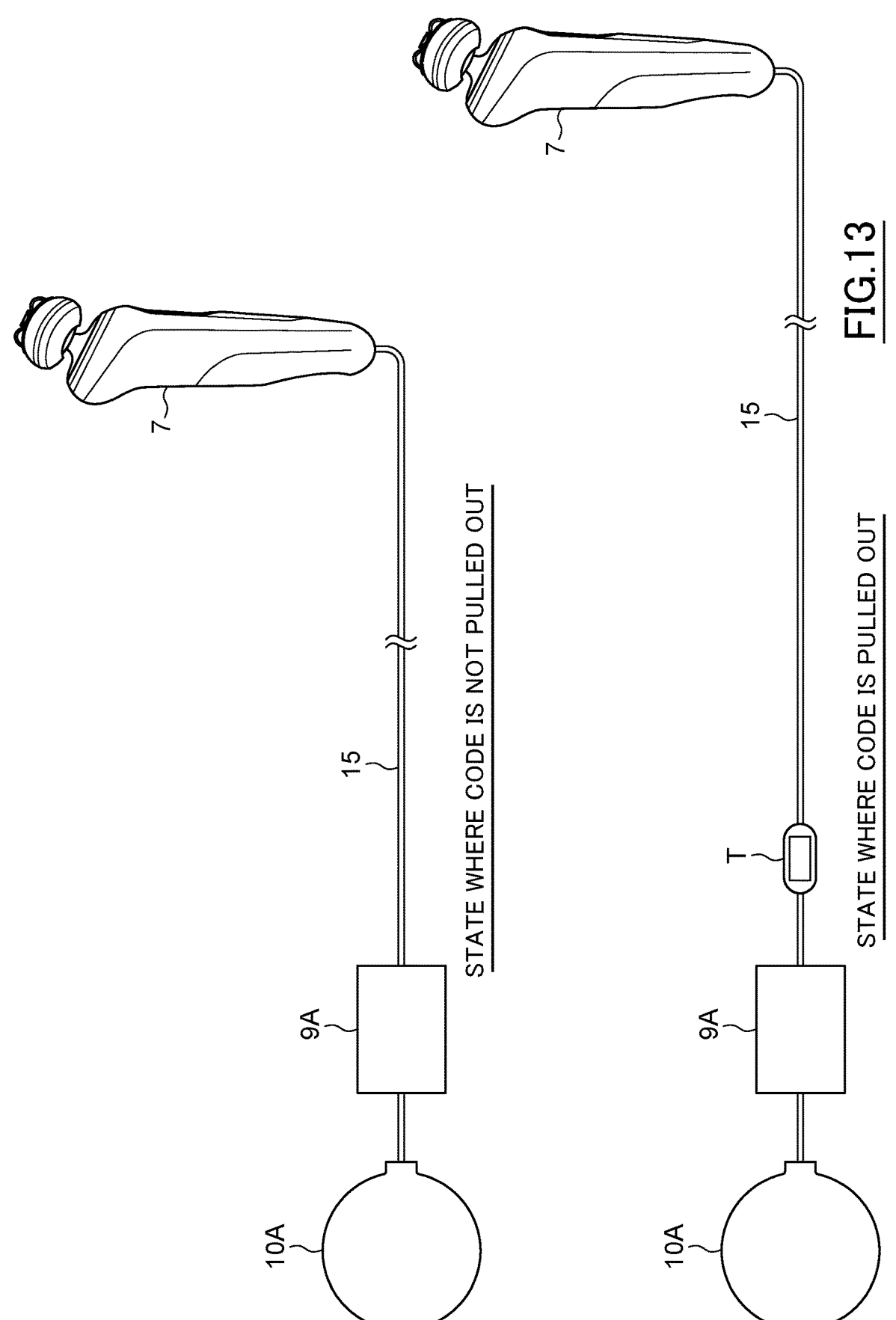
FIG. 13 illustrates positional relations between the IoT tag and the product in a state where the code is not pulled out and in a state where the code is pulled out, in a product managing system according to a second embodiment.

As illustrated in FIG. 13, the item managing apparatus according to the one embodiment includes a cord winding device 10A (one example of the item attachment device) and an accommodation member 9A (one example of the device accommodation part). One end of the cord 15 is attached to the product 7, and the other end of the cord 15 is fixed to the cord winding device 10A. The cord winding device 10A and the accommodation member 9A are fixed to the base 33 of the product shelf 3 by double-sided tape, an adhesive, or the like, for example.

In the embodiment of FIG. 13, in a state where the cord 15 is not pulled out from the cord winding device 10A, the tag T is accommodated in the accommodation member 9A. When the cord 15 is pulled out from the cord winding device 10A, the tag T attached to the cord 15 moves together with the cord 15, and exits from the accommodation member 9A and becomes exposed.

FIG. 14 illustrates a configuration of the cord winding device 10A. As illustrated in FIG. 14, the cord winding device 10A is substantially disk-shaped, and includes a periphery at which a protrusion 10d is provided. A penetration hole 10da for pulling out and winding the cord 15 is formed in the protrusion 10d.

The D-D section in FIG. 14 is the same as the C-C section in FIG. 7. The cord winding device 10A is the same as the cord winding device 10 (FIG. 7) in including the cord winding portion 13 and the spiral spring 14. Meanwhile, the cord winding device 10A differs from the cord winding device 10 in that the cord winding device 10A does not include the accommodation part 16.

Figure 15:
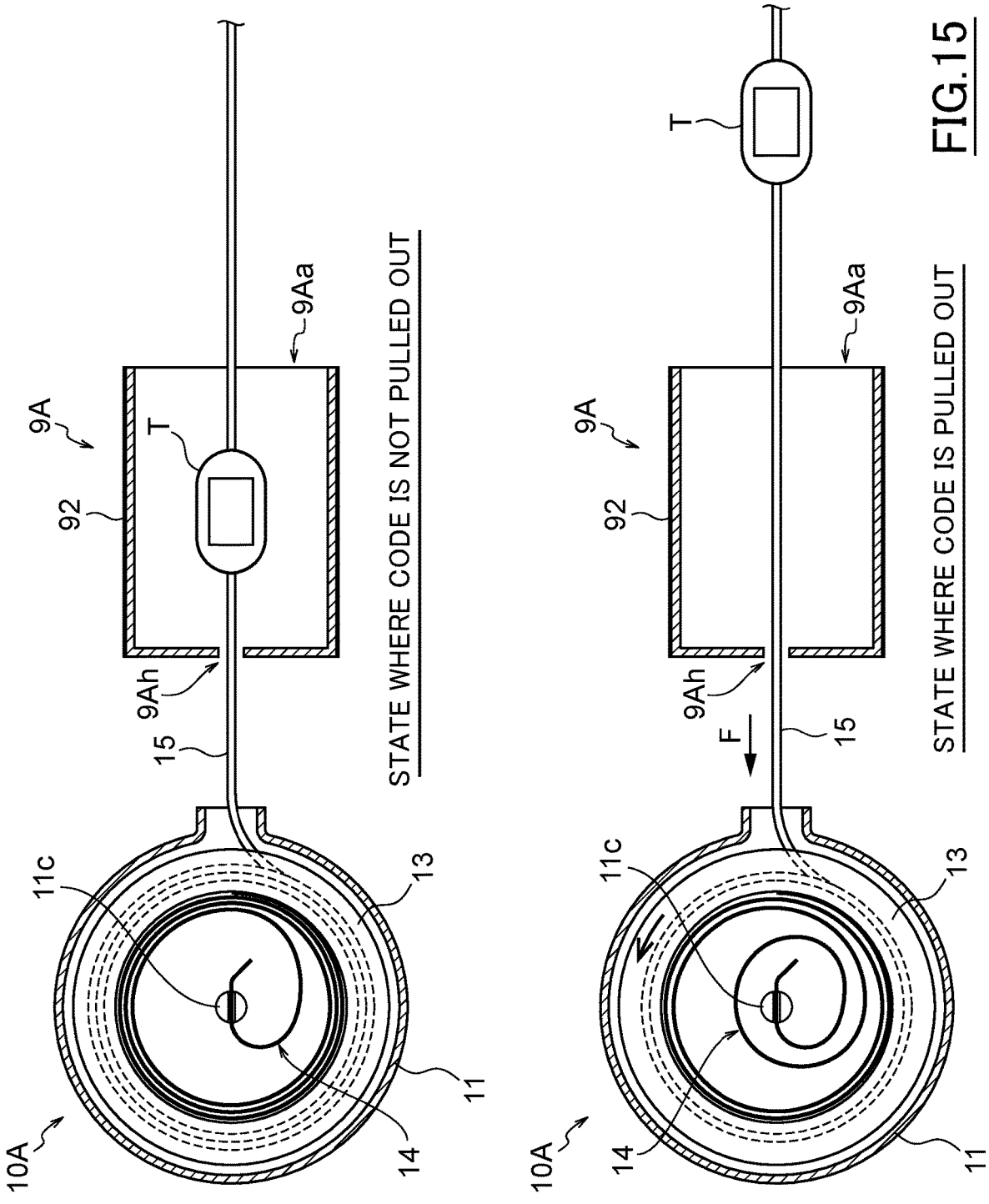
FIG. 15 illustrates sectional views of the cord winding device and an accommodation member illustrated in FIG. 14 in a state where the cord is not pulled out and in a state where the cord is pulled out.

FIG. 15 illustrates plan views of the cord winding device 10A and the accommodation member 9A in a state where the cord 15 is not pulled out and in a state where the cord 15 is pulled out. FIG. 15 illustrates sections of the cord winding device 10A and the accommodation member 9A.

As illustrated in FIG. 15, the accommodation member 9A is a bag-shaped member having an opening 9Aa through which the tag T can enter or exit. The accommodation member 9A is made of plastic, for example. An electromagnetic shield layer 92 is formed on an outer surface of the accommodation member 9A. The electromagnetic shield layer 92 may have a configuration similar to that of the electromagnetic shield layer 161 (FIG. 8), and exhibits the electromagnetic shielding function for the tag T when the tag T is accommodated inside the accommodation member 9A.

A hole 9Ah is formed in the accommodation member 9A, on a side (a side of the cord winding device 10A) opposite to the opening 9Aa. The hole 9Ah has a size enough to allow the cord 15 to pass through hole 9Ah.

When the product 7 is set in the holder 30, the cord 15 is not pulled out as illustrated in FIG. 15. In this state, the spiral spring 14 is not wound up, and the restoring force of the spiral spring 14 does not act on the cord 15 or slightly acts on the cord 15. In this state, the tag T attached to the cord 15 is accommodated inside the accommodation member 9A. Thus, due to the effect of the electromagnetic shield layer 92, the tag T cannot communicate with the wireless device 2, or even if it can, a frequency of the communication of the tag T with the wireless device 2 is small.

Meanwhile, when the product 7 is detached from the holder 30, the cord 15 is pulled out from the cord winding device 10A. In this state, the cord 15 is pulled out and the spiral spring 14 is wound up, and the restoring force F of the spiral spring 14 acts in the direction of winding the cord 15. In this state, the tag T moves together with the product 7 to exit from the opening 9Aa of the accommodation member 9A and become exposed. Thus, the tag T becomes uninfluenced by the effect of the electromagnetic shield layer 92. Accordingly, the tag T can communicate with the wireless device 2, or becomes able to frequently communicate with the wireless device 2.

When the product 7 is returned to the holder 30, the restoring force F of the spiral spring 14 acting in the direction of winding the cord 15 causes the tag T to be accommodated into the accommodation member 9A as the cord 15 moves in the winding direction.

Next, an item managing apparatus according to still another embodiment will be described with reference to FIG. 16 and FIG. 17. This item managing apparatus differs from the item managing apparatus described with reference to FIG. 13 to FIG. 15 in that a cord winding device is incorporated into an accommodation member.

Figure 16:
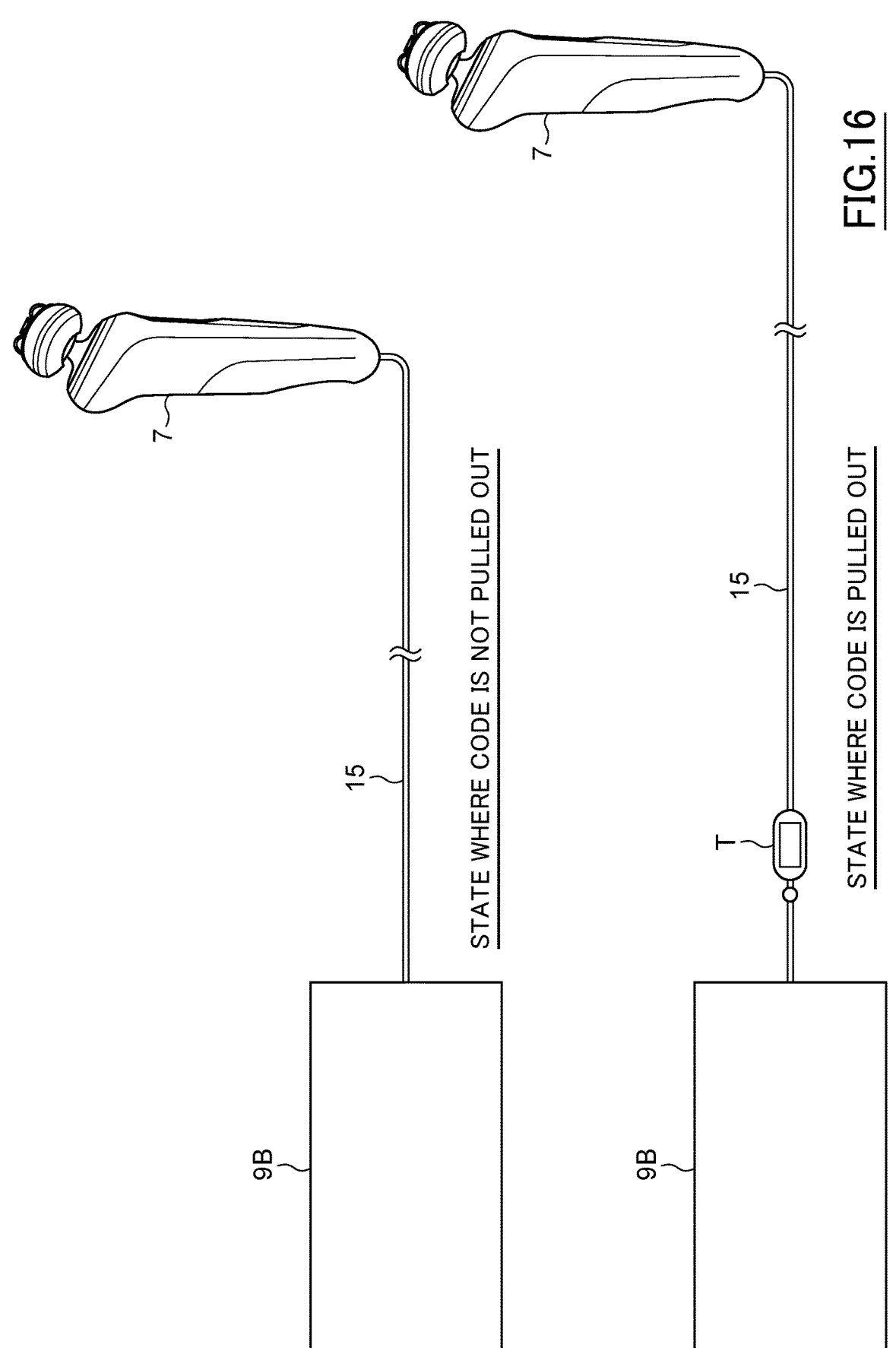
FIG. 16 illustrates positional relations between the IoT tag and the product in a state where a cord is not pulled out and in a state where the cord is pulled out, in the product managing system according to the second embodiment.

As illustrated in FIG. 16, the item managing apparatus according to the one embodiment includes the accommodation member 9B (one example of the device accommodation part). The accommodation member 9B is fixed to the base 33 of the product shelf 3 for example, by double-sided tape, an adhesive, or the like, for example. Although not visible in FIG. 16, the cord winding device 10A (refer to FIG. 14) is incorporated into the accommodation member 9B. The cord winding device 10A is fixed to an inner surface of the accommodation member 9B by a known method.

In the embodiment of FIG. 16, in a state where the cord 15 is not pulled out from the cord winding device 10A, the tag T is accommodated in the accommodation member 9B. When the cord 15 is pulled out from the cord winding device 10A, the tag T attached to the cord 15 moves together with the cord 15 to exit from the accommodation member 9B and become exposed.

Figure 17:
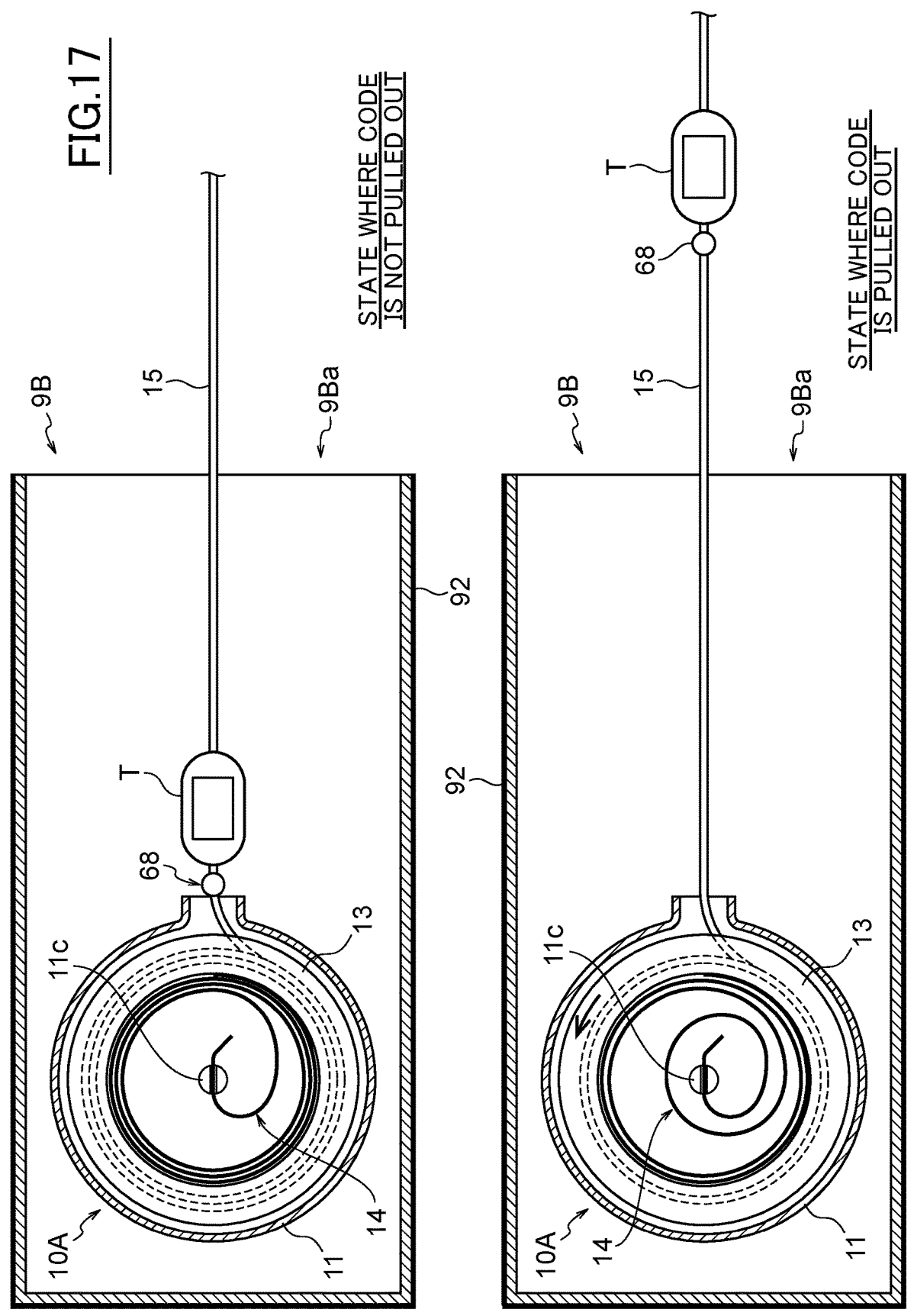
FIG. 17 illustrates sectional views of an accommodation member illustrated in FIG. 16 in a state where the cord is not pulled out and in a state where the cord is pulled out.

FIG. 17 illustrates plan views of the cord winding device 10A and the accommodation member 9B in a state where the cord 15 is not pulled out and in a state where the cord 15 is pulled out. FIG. 17 illustrates sections of the cord winding device 10A and the accommodation member 9B.

As illustrated in FIG. 17, the accommodation member 9B is a hollow member having a shape of a rectangular parallelepiped. The accommodation member 9B has an opening 9Ba through which the tag T can enter or exit. The accommodation member 9B is made of plastic, for example. The electromagnetic shield layer 92 is formed on an outer surface of the accommodation member 9B. The electromagnetic shield layer 92 exhibits the electromagnetic shielding function for the tag T when the tag T is accommodated inside the accommodation member 9B.

When the product 7 is set in the holder 30, the cord 15 is not pulled out as illustrated in FIG. 17. In this state, the spiral spring 14 is not wound up, and the restoring force of the spiral spring 14 does not act on the cord 15 or slightly acts on the cord 15. In this state, the tag T attached to the cord 15 is accommodated inside the accommodation member 9B. Thus, due to the effect of the electromagnetic shield layer 92, the tag T cannot communicate with the wireless device 2, or even if it can, a frequency of the communication of the tag T with the wireless device 2 is small.

Meanwhile, when the product 7 is detached from the holder 30, the cord 15 is pulled out from the cord winding device 10A. In this state, the cord 15 is pulled out and the spiral spring 14 is wound up, and the restoring force F of the spiral spring 14 acts in the direction of winding the cord 15. In this state, the tag T moves together with the product 7 to exit from the opening 9Ba of the accommodation member 9B and become exposed. Thus, the tag T becomes uninfluenced by the effect of the electromagnetic shield layer 92. Accordingly, the tag T can communicate with the wireless device 2, or becomes able to frequently communicate with the wireless device 2.

When the product 7 is returned to the holder 30, the restoring force F of the spiral spring 14 acting in the direction of winding the cord 15 causes the tag T to be accommodated into the accommodation member 9B as the cord 15 moves in the winding direction.

As illustrated in FIG. 17, a stopper 68 is preferably attached to a part that is included in the cord 15 and that is positioned near the tag T and on a side of the cord winding device 10A. The stopper 68 has a form of a size enough to prevent the stopper 68 from passing through the penetration hole 10da of the cord winding device 10A. The stopper 68 functions as a stopper for the cord 15 when the cord 15 is wound. Thereby, the stopper 68 protects the tag T.

Next, a method for arranging the item managing apparatus will be described with reference to FIG. 18 to FIG. 20. The following describes other embodiments of the method for arranging the item managing apparatus including the cord winding device 10 illustrated in FIG. 2, but can be applied also to the item managing apparatus of the embodiments illustrated in FIG. 13 and FIG. 16.

In the embodiment illustrated in FIG. 2, the holder 30 and the cord winding device 10 are arranged on the same plane, i.e., on the upper surface of the base 33 of the product shelf 3, but there is no limitation to this.

Figure 18:
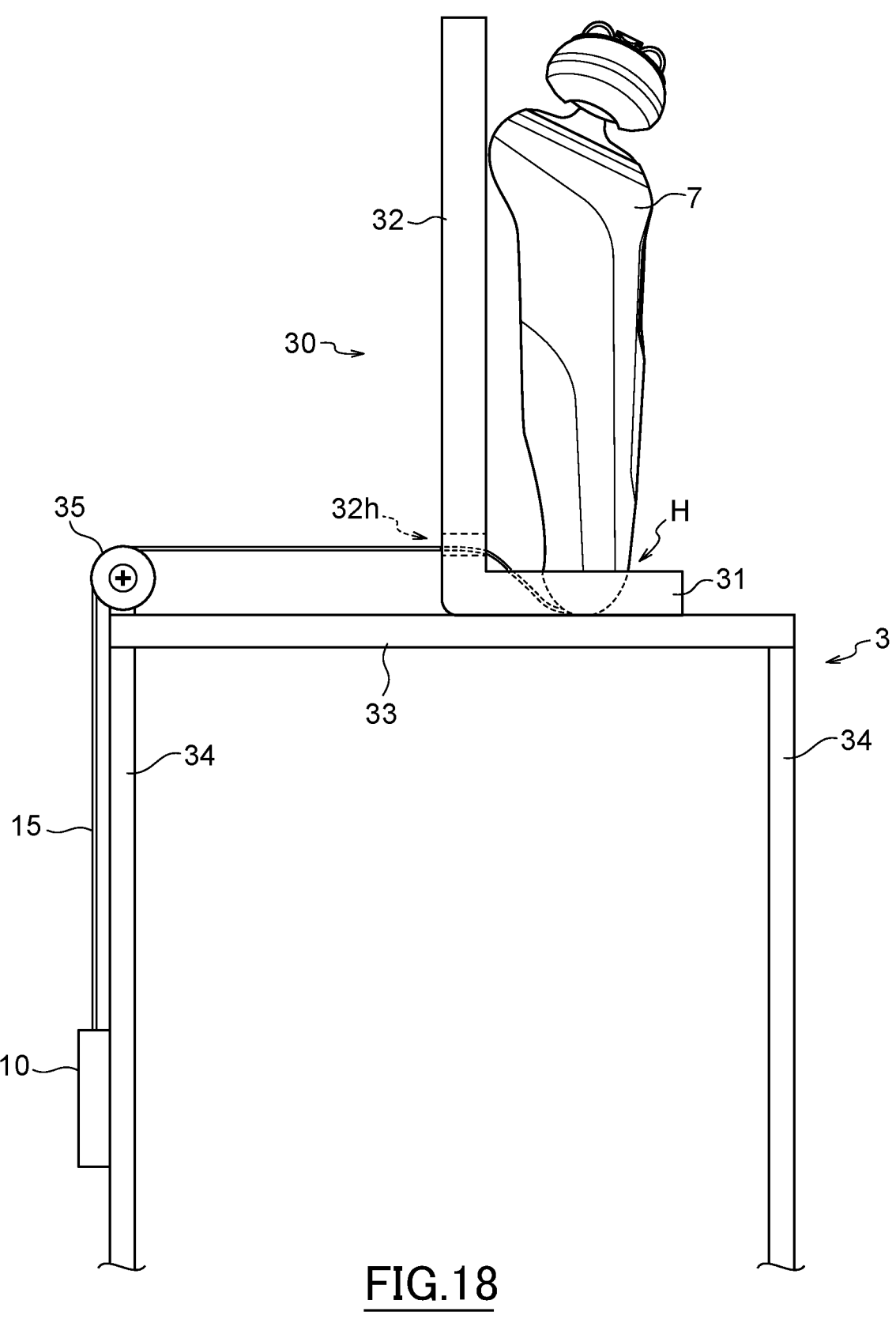
FIG. 18 illustrates a modified example of a method for arranging the cord winding device illustrated in FIG. 2.

In the one embodiment, the cord winding device 10 may be positioned on the leg 34 as illustrated in FIG. 18. Although a method for fixing the cord winding device 10 to the leg 34 is not particularly limited, the cord winding device 10 may be fixed to the leg 34 by a known method such as fastening or an adhesive, for example. In this embodiment, a roller 35 is provided at a position where the base 33 intersects with the leg 34. The roller 35 is thus provided in such a way that the cord 15 can move smoothly between the product 7 arranged on the base 33 of the product shelf 3 and the cord winding device 10 on the leg 34.

Figure 19:
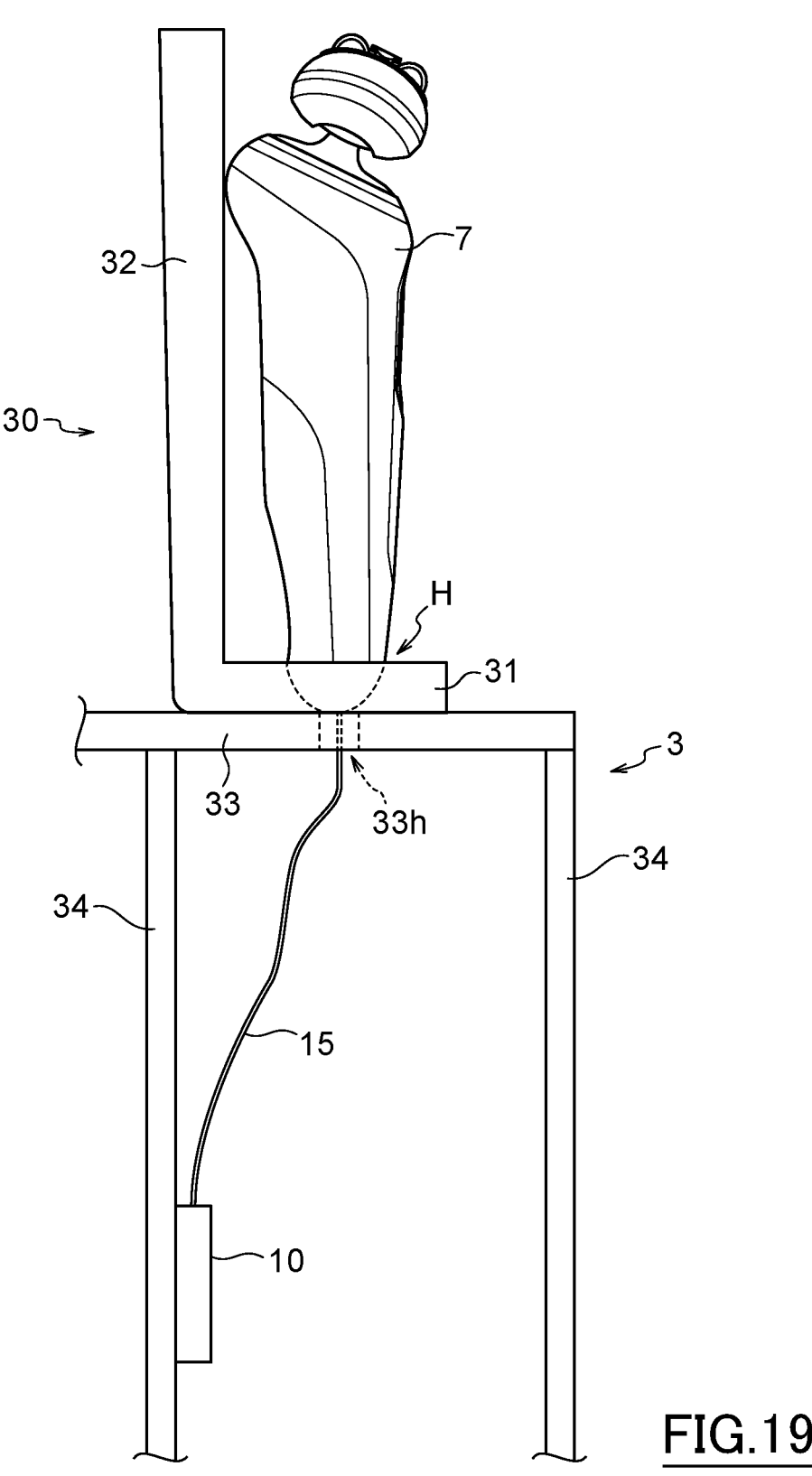
FIG. 19 illustrates a modified example of a method for arranging the cord winding device illustrated in FIG. 2.

In the one embodiment, as illustrated in FIG. 19, the cord winding device 10 may be arranged between a pair of the front and rear legs 34. The cord winding device 10 is arranged at and fixed to the leg 34. In this embodiment, a hole 33h is formed in the base 33 of the product shelf 3. The cord 15 attached to the product 7 is guided through the hole 33h into a space between a pair of the legs 34.

Although not illustrated, the wireless device 2 is preferably arranged between a pair of the front and rear legs 34 in this embodiment.

In the above-described embodiments, the item managing apparatus is described as one using the cord winding device, but there is no limitation to this. It is appropriate that the cord 15 can be wound after the product 7 is detached from the holder 30. In terms of this, in one embodiment, a weight also can be used for winding the cord 15 without using the cord winding device.

Figure 20:
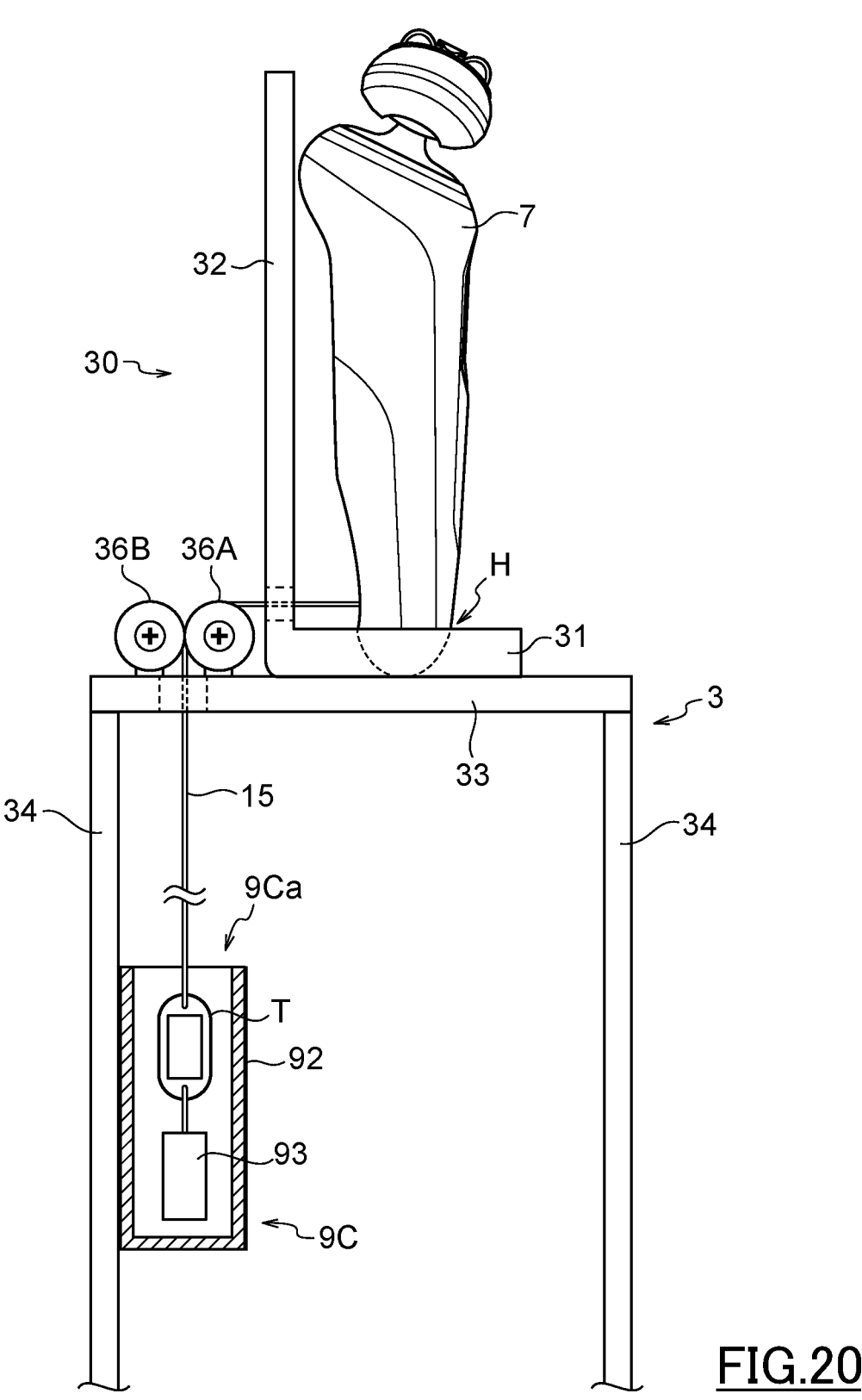
FIG. 20 illustrates a modified example of a method for arranging the cord winding device illustrated in FIG. 2.

FIG. 20 illustrates the embodiment that uses a weight 93 for winding the cord 15. In this embodiment, an accommodation member 9C (one example of a device accommodation part) is arranged between a pair of the front and rear legs 34 of the product shelf 3. FIG. 20 illustrates a section of only the accommodation member 9C for the purpose of making the inside visible.

As illustrated in FIG. 20, the accommodation member 9C is a hollow member having a shape of a rectangular parallelepiped. The accommodation member 9C has an opening 9Ca through which the tag T can enter or exit. The accommodation member 9C is made of plastic, for example. The electromagnetic shield layer 92 is formed on an outer surface of the accommodation member 9C. The electromagnetic shield layer 92 exhibits the electromagnetic shielding function for the tag T when the tag T is accommodated inside the accommodation member 9C. One end of the cord 15 is attached to the product 7, and the other end of the cord 15 is attached to the weight 93 in the accommodation member 9C. Rollers 36A and 36B are provided for smooth movement of the cord 15. The cord 15 is coupled to the tag T and the weight 93 through an opening formed in base 33. The tag T illustrated in FIG. 20 is based on the attachment method illustrated in FIG. 5.

In the embodiment illustrated in FIG. 20, when the product 7 is held by the holder 30, the tag T attached to the cord 15 is pulled into an inside of the accommodation member 9C by the gravity of the weight 93, and can hardly communicate with the wireless device 2 due to the electromagnetic shield layer 92. Meanwhile, when the product 7 is detached from the holder 30, the tag T moves upward together with the weight 93 and becomes exposed from the accommodation member 9C, and thereby becomes able to communicate with the wireless device 2.

In the embodiment illustrated in FIG. 20, a pulley is preferably provided between the rollers 36A and 36B and the accommodation member 9C to reduce lifting force when a customer detaches and lifts the product 7.

Although the embodiments of the item managing apparatus, the item managing system, and the item managing method of the present invention are described above, the present invention is not limited to the above-described embodiments. The above-described embodiments can be variously improved or modified within a range that does not depart from the essence of the present invention.

The present invention is related to the patent application of Japanese Patent Application No. 2022-30449 filed with the Japan Patent Office on Feb. 28, 2022, the entire contents of which are incorporated by reference into the description of the present application.

The invention claimed is:

1. An item managing apparatus comprising:
an item attachment device including a linear member and a biasing member, the linear member including one end that is attached to an item, the biasing member biasing the linear member from the one end in a first direction;
a communication device attached to the linear member; and
a device accommodation part that can accommodate the communication device, the device accommodation part being configured to exert an electromagnetic shielding function for the communication device when the communication device is accommodated in the device accommodation part, wherein
when no external force is applied to the item against biasing force of the first direction generated by the biasing member, the communication device is accommodated in the device accommodation part, and when external force is applied to the item against the biasing force of the first direction generated by the biasing member, the communication device is enabled to exit from the device accommodation part.

2. The item managing apparatus according to claim 1, wherein
the item attachment device includes a case that accommodates the biasing member, and
a winding mechanism is incorporated in the case, the winding mechanism being configured to be able to wind at least a part of a portion included in the linear member and exposed from the case, with the biasing force of the first direction generated by the biasing member.

3. The item managing apparatus according to claim 2, wherein
the case and the device accommodation part are formed integrally with each other.

4. The item managing apparatus according to claim 2, wherein
the case is incorporated into the device accommodation part.

5. The item managing apparatus according to claim 1, wherein
the biasing member is a weight attached to the other end of the linear member.

6. The item managing apparatus according to claim 1, wherein
the item is a product arranged in a store for being tried out.

7. An item managing system comprising:
the item managing apparatus according to claim 1;
a wireless device wirelessly communicating with the communication device; and
a measurement device configured to acquire a result of whether communication by the wireless device with the communication device is possible over time, and, based on the result of whether the communication is possible, to measure a frequency at which the wireless device is able to communicate with the communication device.

8. The item managing system according to claim 7, further comprising a reference communication device arranged at a position that is not shielded by the device accommodation part when the communication device is accommodated in the device accommodation part, wherein
the wireless device communicates with the reference communication device, and
the measurement device is configured to acquire a result of whether communication by the wireless device with the reference communication device is possible over time, and, based on the result of whether the communication is possible, to measure a frequency at which the wireless device is able to communicate with the reference communication device.

9. The item managing system according to claim 7, wherein
the communication device is a wireless tag that collects surrounding radio waves and converts the collected radio waves into electric power, the wireless tag including a capacitor that stores the electric power.

10. The item managing system according to claim 7, wherein the communication device is a UHF-band wireless tag.

11. The item managing system according to claim 7, wherein the communication device is an HF-band wireless tag.

12. The item managing system according to claim 7, wherein the communication device is a microwave-band wireless tag.

13. An item managing method comprising:

providing an item attachment device including a linear member and a biasing member, the linear member including one end that is attached to an item, the biasing member biasing the linear member from the one end in a first direction;

attaching a communication device to the linear member;

configuring a device accommodation part having an electromagnetic shielding function, in such a way that the communication device is accommodated in the device accommodation part when no external force is applied to the item against biasing force of the first direction generated by the biasing member, exiting, by the communication device, from the device accommodation part, with external force applied to the item against the biasing force of the first direction generated by the biasing member, and communicating with a wireless device; and acquiring a result that concerns whether communication by the wireless device with the communication device is possible over time, and measuring a frequency at which the wireless device is able to communicate with the communication device, based on the result of whether the communication is possible.

14. An item managing system comprising:

the item managing apparatus according to claim 2;

a wireless device wirelessly communicating with the communication device; and a measurement device configured to acquire a result of whether communication by the wireless device with the communication device is possible over time, and, based on the result of whether the communication is possible, to measure a frequency at which the wireless device is able to communicate with the communication device.

15. The item managing system according to claim 14, further comprising a reference communication device arranged at a position that is not shielded by the device accommodation part when the communication device is accommodated in the device accommodation part, wherein the wireless device communicates with the reference communication device, and the measurement device is configured to acquire a result of whether communication by the wireless device with the reference communication device is possible over time, and, based on the result of whether the communication is possible, to measure a frequency at which the wireless device is able to communicate with the reference communication device.

\* \* \* \* \*